(12) United States Patent
Nakane et al.

(10) Patent No.: US 7,787,341 B2
(45) Date of Patent: Aug. 31, 2010

(54) OPTICAL DISK DEVICE AND METHOD FOR DETERMINING DISK TYPE

(75) Inventors: Hiroshi Nakane, Fukaya (JP); Mikio Kakizaki, Tokyo (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 821 days.

(21) Appl. No.: 11/677,930

(22) Filed: Feb. 22, 2007

(65) Prior Publication Data

US 2007/0230304 A1 Oct. 4, 2007

(30) Foreign Application Priority Data

Mar. 30, 2006 (JP) .............................. 2006-095148

(51) Int. Cl.
*G11B 7/00* (2006.01)

(52) U.S. Cl. ................................. 369/53.22; 369/44.26

(58) Field of Classification Search .............. 369/53.22, 369/47.1, 47.27, 275.3, 47.28, 44.26, 44.25, 369/44.27, 53.23, 44.28
See application file for complete search history.

(56) References Cited

FOREIGN PATENT DOCUMENTS

| JP | 9-204729 | 8/1997 |
| JP | 9-330554 | 12/1997 |
| JP | 10-188458 | 7/1998 |
| JP | 2000-285582 | 10/2000 |
| JP | 2001-184676 | 7/2001 |
| JP | 2002-32912 | 1/2002 |
| JP | 2003-217135 | 7/2003 |
| JP | 2004-39094 | 2/2004 |
| JP | 2004-152452 | 5/2004 |
| JP | 2004-171720 | 6/2004 |
| JP | 2004-246990 | * 9/2004 .............. 369/53.22 |
| JP | 2004-303344 | 10/2004 |
| JP | 2005-285153 | 10/2005 |
| JP | 2006-4528 | 1/2006 |
| JP | 2006-31779 | 2/2006 |

* cited by examiner

*Primary Examiner*—Nabil Z Hindi
(74) *Attorney, Agent, or Firm*—Oblon, Spivak, McClelland, Maier & Neustadt, L.L.P.

(57) ABSTRACT

An optical disk device includes a pickup head, and a controller which controls the pickup head. The controller subtracting a second measured value determined from an amplitude value of the tracking error signal when the pickup head irradiates a second area of the optical disk with a first DVD laser beam, from a first measured value determined from the amplitude value of the tracking error signal output when the pickup irradiates a first area of the optical disk with the first DVD laser beam, to determine an evaluation value. The controller determining that the optical disk is the first DVD if the evaluation value is smaller than a reference value, and determining that the installed optical disk is a second DVD if the evaluation value is larger than the reference value, the second DVD optical disk having a smaller track width than the first DVD optical disk.

14 Claims, 10 Drawing Sheets

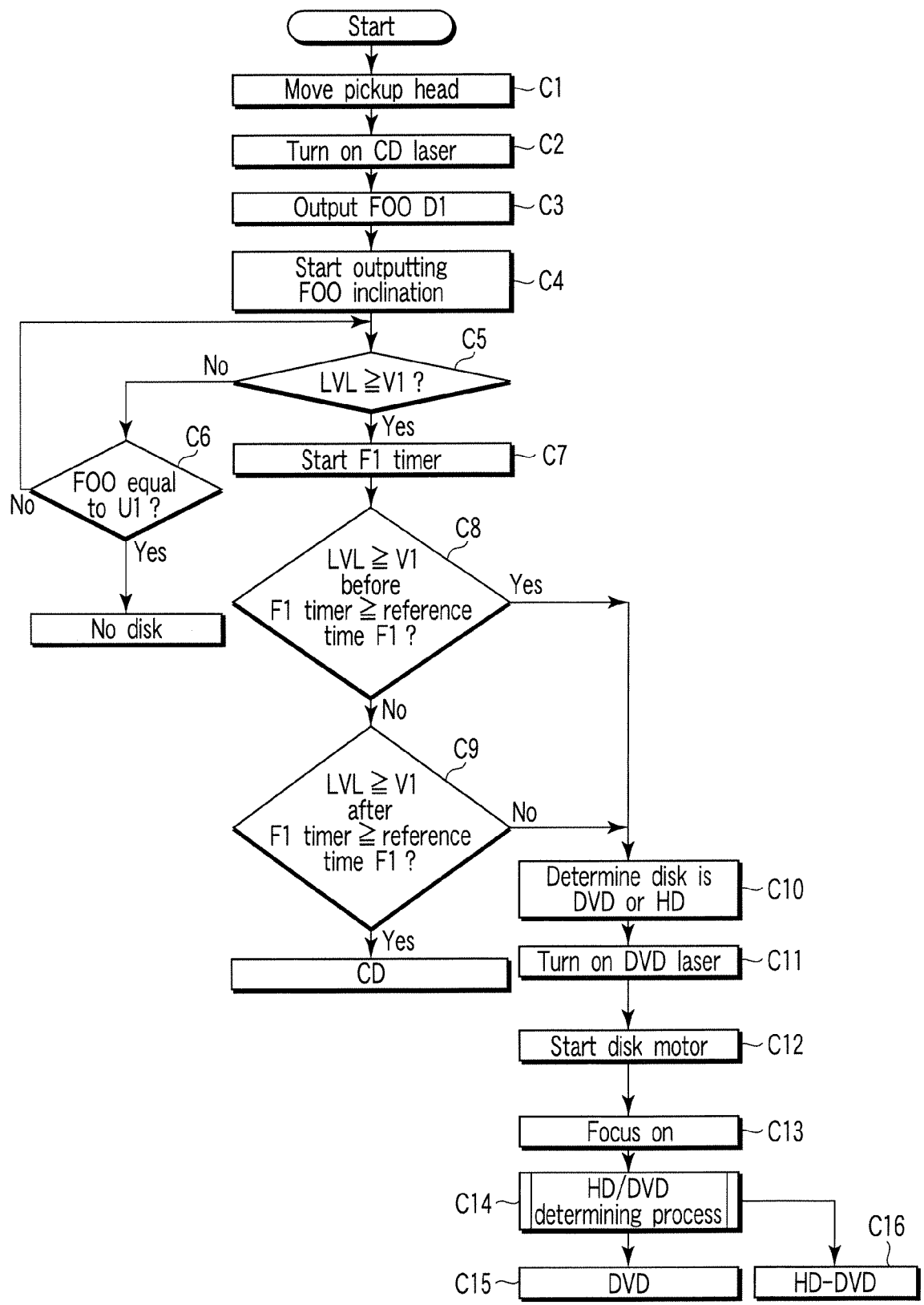
F I G. 13

OPTICAL DISK DEVICE AND METHOD FOR DETERMINING DISK TYPE

CROSS-REFERENCE TO RELATED APPLICATIONS

This application is based upon and claims the benefit of priority from prior Japanese Patent Application No. 2006-095148, filed Mar. 30, 2006, the entire contents of which are incorporated herein by reference.

BACKGROUND OF THE INVENTION

1. Field of the Invention

The present invention relates to an optical disk device that can record or reproduce data on or from plural types of optical disks, and a method for determining the type of a disk in the optical disk device.

2. Description of the Related Art

Optical disk devices can record or reproduce data on or from plural types of optical disks. Types of optical disks used in optical disk devices include, for example, CD (Compact Disk)-based disks (CD-ROM, CD-R, CD-RW, and the like), DVD (Digital Versatile Disk)-based disks (DVD-ROM, DVD-RAM, DVD-R, DVD-RW, DVD+R, DVD+RW, and the like), and HD-DVD (High Definition DVD) that uses a blue laser to record or reproduce data (hereinafter sometimes referred to as HD-DVD or simply HD). An optical disk device dealing with plural types of optical disks needs to determine the types of installed optical disks.

The following methods for determining a disk type have been documented.

A disk type determining apparatus described in Jpn. Pat. Appln. KOKAI Publication No. 10-188458 determines the types of optical disks on the basis of the positions of reflection layers in each optical disk (CD or DVD) and the thickness of a transparent substrate formed on the reflection layers. The disk type determining apparatus detects a detection signal corresponding to a reflected light beam from an optical disk while moving an objective lens that condenses light beams toward the disk. The detection signal varies depending on the number and positions of reflection layers in the optical disk. The disk type determining apparatus determines the type of the disk on the basis of a variation in detection signal, that is, the amounts of time required to detect a peak associated with specular reflection from the disk surface and a peak associated with reflection from the reflection layer.

An optical disk reproducing apparatus described in Jpn. Pat. Appln. KOKAI Publication No. 9-330554 determines the disk type (CD or DVD) on the basis of a tracking error signal. When reproducing data from a second optical disk having a smaller track pitch than a first optical disk, the optical disk reproducing apparatus determines that this is not the first optical disk, on the basis of the tracking error signal. The disk type is determined by comparing the signal level of the tracking error signal with a predetermined threshold or counting the zero cross of the tracking error signal so that the determination can be made on the basis of the count value.

An optical disk device described in Jpn. Pat. Appln. KOKAI Publication No. 2002-32912 detects a normalized tracking error signal obtained by dividing an output from a tracking error signal detecting unit by an output from a reflected light quantity detecting unit; the tracking error signal detecting unit detects the positional deviation, in a radial direction of the optical disk, between a light beam and any of the tracks formed of recesses and projections on the optical disk, and the reflected light quantity detecting unit measures the quantity of light reflected by the disk. The optical disk device determines to which of the disk types involving different groove pitches (pit depth and track pitch) the disk belongs, depending on whether or not the maximum amplitude of a normalized tracking error signal obtained when a light beam traverses the disk in the radial direction has at most a predetermined value. The optical disk device also determines to which of the disk types involving different track pitches the disk belongs, by comparing the number of tracks with a sine wave that synchronizes with eccentricity.

An optical disk device described in Jpn. Pat. Appln. KOKAI Publication No. 9-204729 irradiates recording layers in the optical disk with a laser beam for signal read, and scans the laser beam for signal read over a given range in the radial direction of the optical disk. The optical disk device detects the number of tracks on the basis of signals read, by the scan over the given range, from the optical disk recording layers present within the given range, to determine the type of the optical disk on the basis of the number of tracks.

A disk type determining apparatus described in Jpn. Pat. Appln. KOKAI Publication No. 10-188458 determines the type of the optical disk (CD or DVD) on the basis of the thickness of a base material forming the optical disk and the number of reflection layers in the optical disk. Since CD and DVD have different base material thicknesses, the method described in Jpn. Pat. Appln. KOKAI Publication No. 10-188458 can determine the disk type.

However, this method cannot distinguish DVD from HD-DVD because they have the same base material thickness and the same number of reflection layers. A simple method for determining whether the disk is DVD or HD-DVD is to record or reproduce data on or from a disk of an assumed type, and if the recording or reproduction has been properly achieved, to determine that the disk is of the assumed type. However, if the optical disks have different recording densities (track pitch and pit size), data recording or reproduction must be executed with laser wavelength, NA (Numerical Aperture) of the objective lens, demodulation algorithm, or the like switched depending on the type of the optical disk. Consequently, to determine to which of a plurality of disk types the optical disk belongs, data recording or recording must be executed with the laser wavelength or the like switched depending on the type of each disk. This increases the time required to determine the disk type.

Further, the methods for determining the disk type described in Jpn. Pat. Appln. KOKAI Publication Nos. 9-330554, 2002-32912, and 9-204729 determine the disk type on the basis of the tracking error signal. These methods thus need to properly read the tracking error signal.

However, the large difference in base material thickness between CD and DVD (HD-DVD) leads to optical aberration, which prevents the proper focus error signal from being obtained. This may result in a failure in a focus on operation, which in turn prevents the proper tracking error signal from being obtained. Further, the accuracy of detection of the tracking error signal may be reduced by an error in installation of the optical disk in the optical disk device, eccentricity of the optical disk, or the like. Furthermore, a ROM-based optical disk (stamp media) on which data has already been recorded has a pit depth different from that of a recordable optical disk on which data can be recorded. This may vary the amplitude of the tracking error signal even among optical disks of the same type. This may in turn reduce the accuracy of determination of the disk type.

A blue laser for HD-DVD needs to be used to properly detect the tracking error signal from HD-DVD. However, if CD or DVD is irradiated with a laser beam for HD-DVD (blue laser beam), which has a large quantity of energy, a recordable or rewritable optical disk of CD or DVD may be damaged. Likewise, if CD is irradiated with a laser beam for DVD to detect the tracking error signal, it may be damaged. It is therefore difficult for the conventional techniques to determine to which of a plurality of disk types including HD-DVD the optical disk belongs, without damaging the optical disk.

An object of the present invention is to provide an optical disk device and a method for determining a disk type both of which can determine to which of different optical types the optical disk belongs, in a short time without damaging the optical disk.

BRIEF SUMMARY OF THE INVENTION

According to an aspect of the present invention, there is provided an optical disk apparatus comprising: a pickup head which irradiates a disk with first laser beam or second laser beam having a smaller wavelength than the first laser beam, through an objective lens, tracks being formed in the disk, the light reflected by the disk being input through the pickup head; a first moving unit which moves the pickup head to a position corresponding to a first area in the disk; a signal output unit which outputs a signal corresponding to the reflected light input through the pickup head; and a first disk type determining unit which determines whether the disk is a first disk subjected to information recording and reproduction using the first laser beam or a second disk subjected to information recording and reproduction using the second laser beam, on the basis of an amplitude value of the signal output by the signal output unit irradiated with the first laser beam from the pickup head moved by the first moving unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 13 is a flowchart illustrating a disk type determining process of determining to which of three types the optical disks 10 belongs.

DETAILED DESCRIPTION OF THE INVENTION

An embodiment of the present invention will be described below with reference to the drawings.

Figure 1:
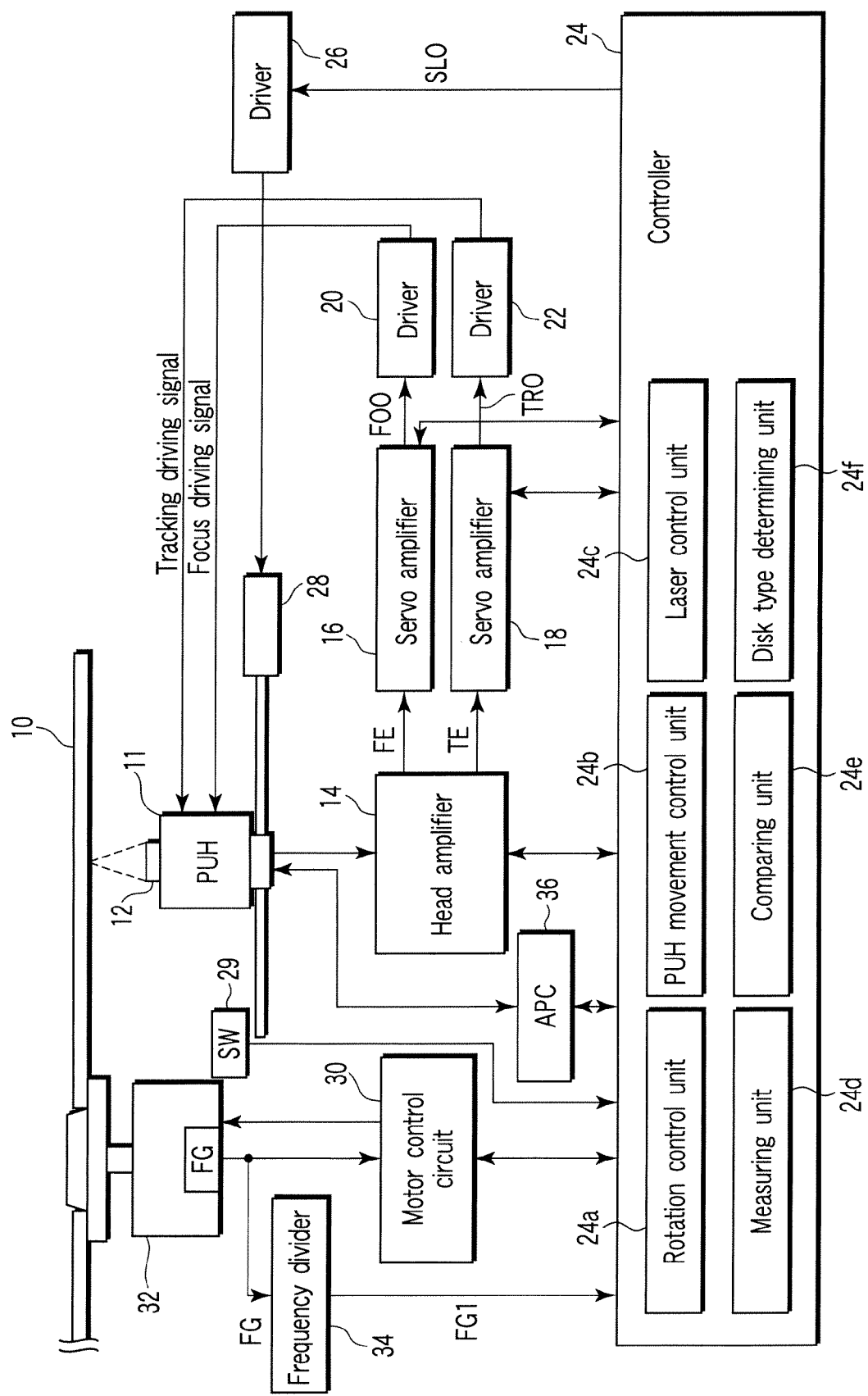
FIG. 1 is a block diagram showing the configuration of an optical disk device according to an embodiment of the present invention.

FIG. 1 is a block diagram showing the configuration of an optical disk device according to the present embodiment.

Spiral tracks are formed in an optical disk 10 serving as recording media and rotatively driven by a disk motor 32. The description below is based on the assumption that three types of optical disks 10, CD (Compact Disk), DVD (Digital Versatile Disk), and HD-DVD (High Definition DVD), can be used in the optical disk device according to the present embodiment. Examples of CD-based disks include CD-ROM, CD-R, and CD-RW. Examples of DVD-based disks include DVD-ROM, DVD-RAM, DVD-R, DVD-RW, DVD+R, and DVD+RW.

A laser beam output by a pickup head (PUH) 11 is used to record or reproduce data on or from the optical disk 10. The pickup head 11 is supported opposite a data read surface of the optical disk 10 so as to be movable in a radial direction of the optical disk 10 by a feed motor 28.

The pickup head 11 includes laser diodes, collimator lens, beam splitter, an objective lens 12, a cylindrical lens, a photodetector, a lens position sensor, and a monitor diode.

The pickup head 11 is also provided with a biaxial actuator that moves the objective lens 12 in two orthogonal directions, that is, a focus actuator that moves the objective lens 12 in a focusing direction (direction of optical axis of the lens) to adjust the focus and a tracking actuator that moves the objective lens 12 in a tracking direction (radial direction of the optical disk 10) to adjust tracking. The focus actuator is controlled by a focus driving signal output by a driver 20. The tracking actuator is controlled by a tracking driving signal from a driver 22.

The laser diodes are driven by APC (Auto Power Control) 36 under the control of a controller 24 (laser control unit 24c) to output laser beam. Laser beam output by the laser diodes is applied to the optical disk 10 via the collimator lens, beam splitter, and objective lens 12.

The optical disk device according to the present embodiment is provided with a plurality of laser diodes that output laser beams of different wavelengths. Specifically, the optical disk device is provided with an infrared laser for CD (wavelength: 780 nm), a red laser for DVD (wavelength: 650 nm), and a blue laser for HD-DVD (wavelength: 405 nm). APC 36 causes laser beam for any of the disks to be output under the control of a controller 24.

The objective lens 12 has a numerical aperture (NA) corresponding to each laser. The spot size of laser beam is about 1.35 μm for laser beam for CD, about 0.94 μm for laser beam for DVD, and about 0.55 μm for laser beam HD-DVD: the laser beam is applied to an information recording layer in the optical disk 10 through the objective lens 12. If a tracking error signal generated by a DPP (Differential Push Pull) method is used for data recording or the like, a diffraction grating provided on an optical path is used to convert laser beam into three beams. The optical disk 10 is thus irradiated with laser beam so that a spot is formed of the three beams.

Reflected light from the optical disk 10 is guided to the photodetector via the objective lens 12, beam splitter, and cylindrical lens. The photodetector is divided into, for example, four segments. Signals detected by the four segments of the photodetector are amplified up to a predetermined voltage value by current-voltage conversion (I-V conversion). The amplified signals are then output to a head amplifier 14.

APC 36 drives the laser diodes under the control of the controller 24 (laser control unit 24c). APC 36 controls on and off of laser outputs and the intensity of laser beam during reproduction or recording. APC 36 controls a driving current output to the laser diodes so that an output from a monitor diode (not shown) mounted inside the pickup head 11 has a predetermined value.

Laser beam output by the laser diodes is applied to the optical disk 10 via the collimator lens, beam splitter, and objective lens 12. Laser beam reflected by the optical disk 10 is guided to the photodetector (photodetectors 11a, 11b, 11c, and 11d) via the objective lens 12, beam splitter, and cylindrical lens.

The head amplifier 14 processes and outputs a signal from the photodetector. The head amplifier 14 generates and outputs a tracking error signal TE, a focus error signal FE indicating an error from a just focus, a sum signal (RF signal) obtained by adding signals output by, for example, the four photodetectors, and the like (this will be described below in detail (see FIG. 2).

The controller 24 executes a disk type determining process for determining the type of the installed optical disk 10 on the basis of signals generated by the head amplifier 14. This will be described below in detail.

The focus error signal FE output by the head amplifier 14 is output to a servo amplifier 16. The tracking error signal TE (DPD or DPP signal) is output to a servo amplifier 18.

The servo amplifier 16 controls the driver 20 in accordance with the focus error signal FE output by the head amplifier 14. The servo amplifier 16 causes the driver 20 to output the focusing driving signal to the focusing actuator (not shown) in the pickup head 11.

The focus driving signal output by the driver 20 drives the focusing actuator, which then executes focus servo such that laser beam output by the pickup head 11 focuses on a recording film in the optical disk 10.

The servo amplifier 18 controls the driver 22 in accordance with the tracking error signal TE output by the head amplifier 14. The driver 22 thus outputs the tracking driving signal to the tracking actuator (not shown) in the pickup head 11.

The tracking driving signal output by the driver 22 drives the tracking actuator, which then executes tracking servo such that laser beam output by the pickup head 11 always traces the tracks formed on the optical disk 10.

The disk motor 32 is, for example, a spindle motor. The disk motor 32 is provided with a frequency generator (FG) that generates a signal depending on rotation angle. The frequency generator outputs FG signals depending on the rotation angle, for example, 18 FG signals per rotation, utilizing a voltage induced by a field coil in a stator or an output from a Hall element that detects the rotation angle of a magnet in a rotor.

A frequency divider 34 divides the frequency of the FG signal output by the disk motor 32 to generate an FG1 signal indicating that the disk motor has rotated once. The frequency divider 34 then outputs the FG1 signal to the controller 24, which then compares the FG1 signal with an internal reference frequency. Then, on the basis of the error between these signals, the controller 24 controls a motor control circuit 30 so that the disk motor 32 is rotated at a predetermined rotation speed.

The controller 24 includes a processor and memories (RAM, ROM, and the like). The controller 24 uses the processor to execute various programs stored in the memories to generally control the entire device. The controller 24 is provided with a rotation control unit 24a, a PUH movement control unit 24b, a laser control unit 24c, a measuring unit 24d, a comparing unit 24e, and a disk type determining unit 24f.

The rotation control unit 24a controls rotation of the disk motor 32 via the motor control circuit 30.

The PUH movement control unit 24b drives the feed motor via a driver 26 to controllably move the pickup head 11 in the radial direction of the optical disk 10. The feed motor 28 is, for example, a stepping motor. When the pickup head 11 is moved in an inner circumferential direction of the optical disk 10, a switch (SW) 29 detects that the pickup head 11 is at a predetermined position. The PUH movement control unit 24b controls movement with respect to the pickup head 11 by using the position of the pickup head 11 detected by the switch 29, as an initial position.

For example, the switch 29 is assumed to be set to detect a radial position of the optical disk 10 which is 25 mm away from the center of the optical disk 10. A change gear ratio is such that one rotation of the feed motor 28 (stepping motor) moves the pickup head 11 3 mm. In this case, the controller 24 (PUH movement control unit 24b) uses the switch 29 to detect the optical disk 10 and then outputs a driving signal SLO for rotating the feed motor 28 once, to the driver 26. This enables the feed motor 28 to rotate once via the driver 26 to move the pickup head 11. For example, when moved in an outer circumferential direction of the optical disk 10, the pickup head 11 travels to a radial position of the optical disk 10 which is 28 mm away from the center of the optical disk 10.

The laser control unit 24c controls APC 36 so that the laser diodes in the pickup head 11 output laser beam. The pickup head 11 is provided with the laser diodes that output infrared laser beam for CD (hereinafter referred to as a CD laser), red laser beam for DVD (hereinafter referred to as a DVD laser), and blue laser beam for HD-DVD (hereinafter referred to as an HD laser). The laser control unit 24c selects one of the laser diodes to cause it to output a laser beam of the corresponding wavelength through the pickup head 11.

The measuring unit 24d irradiates the optical disk 10 with laser beam from the pickup head 11 to measure signals output by the head amplifier 14. The measuring unit 24d measures, for example, the amplitude value of the tracking error signal TE output by the head amplifier 14, that is, the amplitude values of a DPP signal generated by the differential push pull method and a DPD signal generated by a differential phase detection method, and the amplitude value of the addition signal (RF or LVL signal) corresponding to all of the reflected light input to the four photodetectors 11a, 11b, 11c, and 11d, provided in the pickup head 11.

The comparing unit 24e compares the amplitude value of the tracking error signal TE or addition signal measured by the measuring unit 24d with a preset reference value.

The disk type determining unit 24f determines the type of the optical disk 10 on the basis of the comparison executed by the comparing unit 24e.

Figure 2:
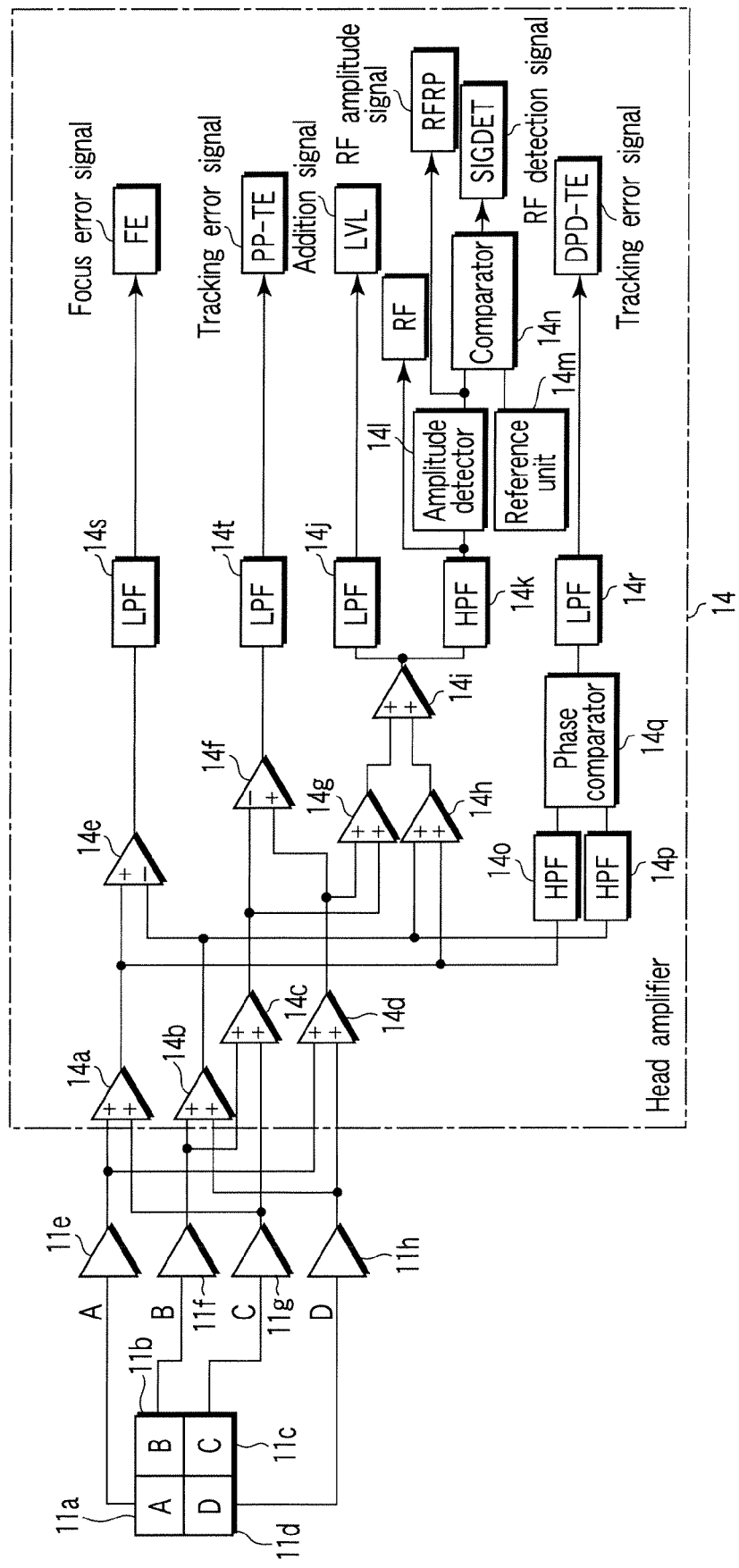
FIG. 2 is a diagram showing, in detail, the configuration of photodetectors in a pickup head 11 and a head amplifier 14 according to the present embodiment.

FIG. 2 is a diagram showing, in detail, the configuration of the photodetectors (11a, 11b, 11c, and 11d) in the pickup head 11 and the head amplifier 14.

Signals A to D detected by the four photodetectors 11a, 11b, 11c, and 11d are subjected, by I-V converters 11e, 11f, 11g, and 11h, to a current voltage conversion so as to have predetermined voltage values; the I-V converters 11e, 11f, 11g, and 11h are provided in the pickup head 11.

The signal A output by the I-V converter 11e is input to adders 14a and 14d in the head amplifier 14. The signal B output by the I-V converter 11f is input to adders 14b and 14c in the head amplifier 14. The signal C output by the I-V converter 11g is input to the adders 14a and 14c in the head amplifier 14. The signal D output by the I-V converter 11h is input to the adders 14b and 14d in the head amplifier 14. The adder 14a thus adds the signals A and C together to output a signal (A+C). Similarly, the adder 14b outputs a signal (B+D), the adder 14c outputs a signal (B+C), and the adder 14d outputs a signal (A+D).

The signal (A+C) output by the adder 14a is input to a subtractor 14e, an adder 14h, and HPF (High Pass Filter) 14o. The signal (B+D) output by the adder 14b is input to the subtractor 14e, the adder 14h, and HPF 14p. The signal (B+C) output by the adder 14c is input to a subtractor 14f and an adder 14g. The signal (A+D) output by the adder 14d is input to the subtractor 14f and adder 14g.

The subtractor 14e subtracts the signal (B+D) from the adder 14d, from the signal (A+C) from the adder 14a to output the resulting signal. The signal output by the subtractor 14e is output via LPF (Low Pass Filter) 14s as the focus error signal FE. That is to say, the focus error signal FE=(A+C)−(B+D).

The subtractor 14f subtracts the signal (B+C) from the adder 14c, from the signal (A+D) from the adder 14d to output the resulting signal. The signal output by the subtractor 14f is output via LPF 14t as the tracking error signal TE based on the differential push pull method (PP−TE). That is to say, the tracking error signal based on the differential push pull method (PP−TE)=(A+D)−(B+C).

The signal (A+C) and the signal (B+D) are input to a phase comparator 14q; the signal (A+C) is output by the adder 14a via HPF 14o and the signal (B+D) is output by the adder 14b via HPF 14p. The phase comparator 14q then outputs a signal indicating the phase difference between the above two signals, that is, a signal obtained by subtracting the signal (B+D) from the signal (A+C). The signal output by the phase comparator 14q is output via LPF 14r as the tracking error signal TE based on the differential phase detection method (DPD−TE). That is to say, the tracking error signal based on the differential phase detection method (DPD−TE)=φ(A+C)−φ(B+D).

The adder 14g adds the signal (A+D) output by the adder 14d to the signal (B+C) output by the adder 14c to output the resulting signal. The adder 14h adds the signal (A+C) output by the adder 14a to the signal (B+D) output by the adder 14b to output the resulting signal. The adder 14i adds the signals output by the adders 14g and 14h together to output the resulting signal. In other words, the adder 14i outputs a signal (A+B+C+D) obtained by adding all signals output by the photodetectors 11a, 11b, 11c, and 11d. The signal output by the adder 14i is output via LPF 14j as an addition signal LVL (hereinafter referred to as an LVL signal). The signal output by the adder 14i is output via HPF 14k as an information signal RF (hereinafter referred to as an RF signal). The signal output by HPF 14k is input to an amplitude detector 14l, which senses the amplitude value of the RF signal to output an RF amplitude signal RFRP that varies in proportion to the amplitude value.

The RF amplitude signal output by the amplitude detector 14l is input to a comparator 14n, which compares a reference value preset in a reference unit 14m with the level of the RF amplitude signal. If the value of level of the RF amplitude signal is larger than the reference value, the comparator 14n outputs an RF detection signal SIGDET (hereinafter referred to as a SIGDET signal). In other words, the SIGDET signal indicates the RF signal, indicating information recorded in the optical disk 10, has been detected.

Now, description will be given of the relationship between the tracks formed on the optical disk 10 and beam spots resulting from laser beam with which the optical disk 10 is irradiated.

Figure 3A:
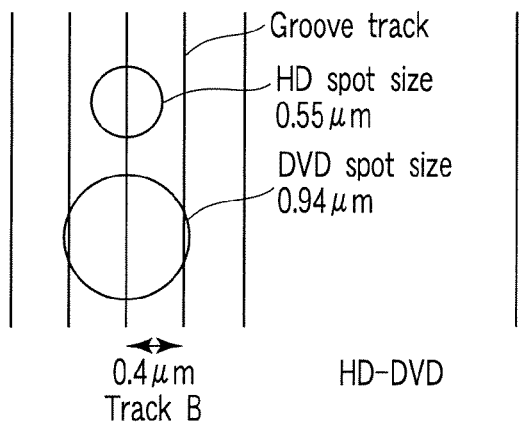
FIGS. 3A, 3B and 3C are diagrams showing the dimensional relationship between tracks formed on an optical disk 10 and beam spots.
Figure 3B:
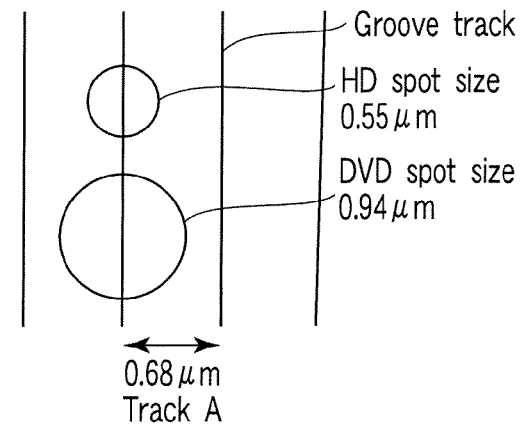
Figure 3C:
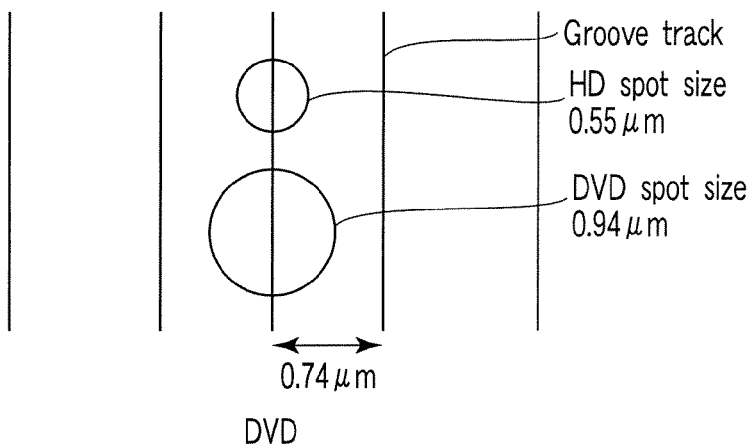

FIGS. 3A, 3B, and 3C are diagrams showing the dimensional relationship between the tracks formed on the optical disk 10 and beam spots.

As shown in FIG. 3C, the pitch of the tracks formed on DVD is 0.74 μm, which is the same for tracks B corresponding to a data area and for tracks A corresponding to a system lead-in area. As shown in FIG. 3C, a beam spot resulting from the red laser for DVD is 0.94 μm in size and thus does not extend over two or more tracks. Consequently, the tracking error signal is properly detected when the data area (tracks A) in DVD is irradiated with laser beam; the signal varies with the tracks formed on the optical disk 10.

In contrast, the pitch of the tracks formed on the optical disk 10 of HD-DVD is 0.68 μm in the system lead-in area (tracks A), formed on the inner circumferential side of the disk, as shown in FIG. 3B, and 0.4 μm in the data area (tracks B), formed closer to the outer circumference than the system lead-in area, as shown in FIG. 3A. The track pitch of the tracks A in HD-DVD is almost the same as that of DVD. However, the track pitch in the tracks B of HD-DVD is smaller than that in the data area of DVD.

Consequently, as shown in FIG. 3B, a beam spot resulting from the red laser does not extend over two tracks for the tracks A (system lead-in area) in HD-DVD, as is the case with DVD. In contrast, as shown in FIG. 3A, the same beam spot extends over two tracks for the tracks B (data area) in HD-DVD. If a beam spot extends over a plurality of tracks, the tracking error signal cannot be properly detected.

Figure 4:
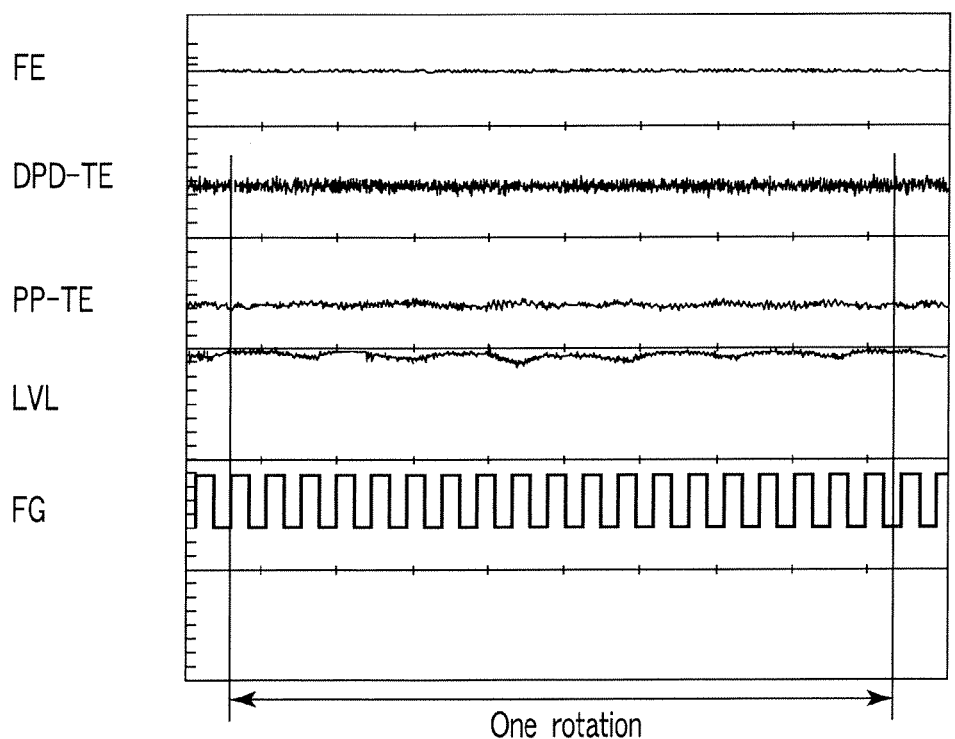
FIG. 4 is a diagram showing an example of waveforms of signals output by the head amplifier 14 when a red laser for DVD is used to focus laser beam on any track B (data area) in HD-DVD according to the present embodiment.
Figure 5:
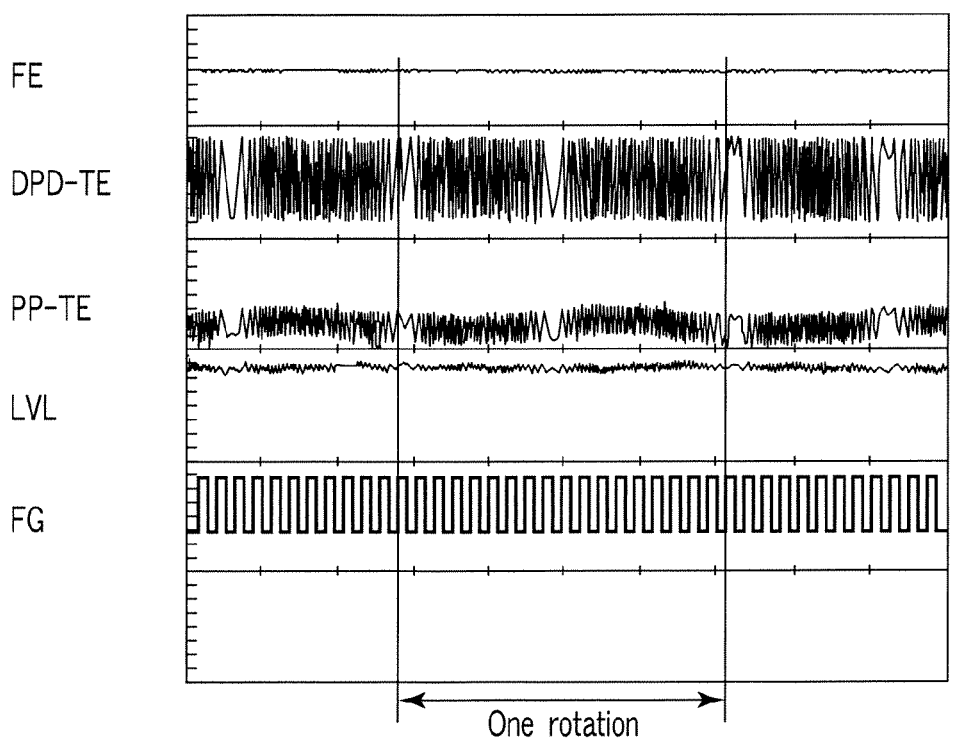
FIG. 5 is a diagram showing an example of waveforms of signals output by the head amplifier 14 when the red laser for DVD is used to focus laser beam on any track A (system lead-in area) in HD-DVD using according to the present embodiment.

FIG. 4 shows the waveforms of signals output by the head amplifier 14 if the red laser for DVD is used to focus laser beam on any of the tracks B (data area) in HD-DVD. FIG. 5 shows the waveforms of signals output by the head amplifier 14 if the red laser for DVD is used to focus laser beam on any of the tracks A (system lead-in area) in HD-DVD.

As shown in FIG. 5, the DPD-TE signal detected in the track A has a sufficiently large amplitude. On the other hand, as shown in FIG. 4, the DPD-TE signal detected in the track B has an extremely small amplitude compared to the waveform shown in FIG. 5. Not only the DPD-TE signal but also the PP-TE signal and LVL signal (RF signal) have larger amplitudes when detected in the track A.

To determine whether the disk is DVD or HD-DVD, the optical disk device according to the present embodiment utilizes the difference in the amplitude value of the tracking error signal TE detected in the area for which DVD and HD-DVD have different track pitches, that is, the data area (tracks B). The optical disk device according to the present invention also avoids damaging the optical disk 10 by using the red laser for DVD to irradiate the optical disk 10 with laser beam in order to detect the tracking error signal TE.

Whether or not the disk is CD is determined before determining whether the disk is DVD or HD-DVD, on the basis of the difference in substrate thickness, that is, the distance from disk surface to recording layer (reflection layer), between CD and DVD/HD-DVD. Also in this case, the red laser for DVD is used, but the time for which the optical disk 10 is irradiated with laser beam is reduced to avoid damaging CD.

Now, description will be given of a disk type determining process executed by the optical disk device according to the present embodiment.

First, with reference to the flowchart shown in FIG. 6, description will be given of a disk type determining process of determining whether the disk is DVD or HD-DVD. The disk type determining process shown in the flowchart in FIG. 6 determines whether the disk is DVD or HD-DVD, on the basis of the amplitude values of the tracking error signals TE detected in the different areas (tracks A and B). Here, the different areas are the system lead-in area (tracks A), formed on the inner circumferential side of the disk, and the data area (tracks B), formed closer to the outer circumference than the system lead-in area. In HD-DVD, the data area has a smaller track pitch than the system lead-in area as shown in FIGS. 3A and 3B.

Figure 7:
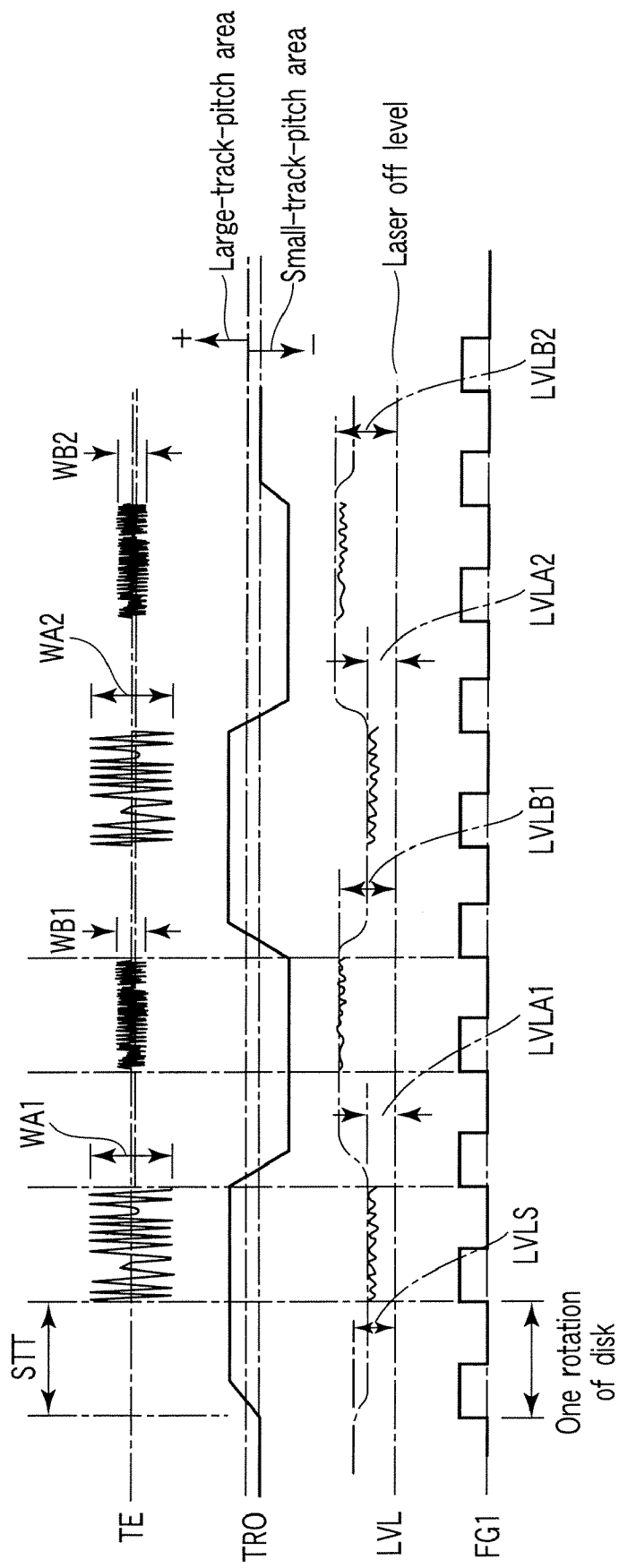
FIG. 7 is a diagram showing an example of variations in signals detected from the data area and the system lead-in area by consecutively changing (shifting) twice the direction of a laser beam emitted by the pickup head 11 according to the present embodiment.

FIG. 7 is a diagram showing variations in signals detected from the data area and system lead-in area by consecutively shifting twice laser beam emitted by the pickup head 11, in the radial direction of the optical disk 10 (moving the irradiation position).

First, the optical disk 10 is installed on the disk motor 32. Then, the rotation control unit 24a of the controller 24 controls the motor control circuit 30 so that the disk motor 32 is rotated at a predetermined rotation speed (step A1). The laser control unit 24c controls APC 36 so that the DVD laser in the pickup head 11 is turned on (step A2).

The controller 24 also operates the servo amplifier 16 to focus laser beam emitted by the pickup head 11 on the optical disk 10. Specifically, the servo amplifier 16 controls the driver 20 in accordance with the focus error signal FE output by the head amplifier 14 to allow the driver 20 to output the focus driving signal to the focusing actuator in the pickup head 11. Laser beam output by the pickup head 11 is thus focused on the recording layer in the optical disk 10 (step A3).

Then, the PUH movement control unit 24b of the controller 24 uses the driver 26 to drive the feed motor 28 to move the pickup head 11 to the neighborhood of the boundary between the system lead-in area (tracks A) and data area (tracks B) in the optical disk 10 (step A4). The boundary position between the lead-in area and the data area is predetermined in the disk standards. Accordingly, the PUH movement control unit 24b can move the pickup head 11 to a position corresponding to the boundary between the lead-in area and the data area by rotating the feed motor 28 by an amount corresponding to the predetermined position on the basis of the initial position of the pickup head 11 detected by the switch 29.

The feed motor 28 is basically controlled so as to move the pickup head 11 to the position corresponding to the boundary between the two areas. However, the pickup head 11 need not necessarily be moved to the exact boundary position. That is to say, the pickup head 11 has only to be moved to the vicinity of the boundary provided that the two areas can be irradiated with laser beam by driving the tracking actuator in the pickup head 11 after having moved the pickup head 11, to swing the objective lens 12 in the radial direction of the optical disk 10.

The controller 24 waits for the FG1 signal output by the frequency divider 34 to rise (step A5). Once the FG1 signal rises, the controller 24 actuates the servo amplifier 18 to allow the driver 22 to output the tracking driving signal to the pickup head 11 (TRO+output) (step A6). In other words, the tracking actuator in the pickup head 11 is driven to displace the objective lens 12 so as to irradiate the system lead-in area (inner circumferential side) with laser beam from the objective lens 12.

The controller 24 then waits for the displacement of the objective lens 12 to stabilize. In FIG. 7, a wait time STT ends at the next rise of the FG1 signal from the frequency divider 34.

Upon detecting the next rise of the FG1 signal (step A7, Yes), the measuring unit 24d of the controller 24 measures the amplitude value of the tracking error signal TE output by the head amplifier 14 as well as the level of the LVL signal (addition signal). The measuring unit 24d then averages the amplitude values measured while the optical disk 10 is rotated once by the disk motor 32, that is, before the next rise of the FG1 signal is detected.

The tracking error signal TE is measured when the optical disk 10 is decentered by an error in installation on the disk motor 32. Accordingly, the tracking error signal TE is measured while the optical disk 10 is being rotated by a predetermined amount, in this case, once, with the amplitude values of the detected signals averaged.

The optical disk 10 may not be eccentric. The objective lens 12 is subjected to tracking shift so that the tracking error signal TE can be measured even in this case. In this case, for example, an AC component may be added to the tracking driving signal (TRO) output by the servo amplifier 18.

For the tracking error signal TE, the measuring unit 24d measures the amplitude value of the DPD-TE signal generated on the basis of the differential phase detection method if the SIGDET signal is being output. The DPD-TE signal is generated on the basis of the phase difference among signals detected by the plurality of photodetectors. Consequently, the amplitude value is not affected by the quantity of light incident on the photodetectors. This enables the amplitude value to be stably measured.

If the SIGDET signal is not being output (L level), the measuring unit 24d measures the amplitude value of the PP-TE signal generated on the basis of the differential push pull method. Specifically, the measurement is made on the basis of the following fact: if the optical disk 10 is recordable media (DVD-R, DVD-RW, DVD+R, DVD+RW, or the like) and data has not been recorded on the optical disk 10, the SIGDET signal is not output, but even in this case, the amplitude value of the PP-TE signal can be detected at a level specified for the differential push pull method. However, the amplitude value of the PP-TE signal is affected by the quantity of light incident on the photodetectors and the depth of pits formed in the optical disk 10. Nevertheless, these adverse effects can be reduced by, for example, normalization based on the signal level of the LVL signal.

Here, the amplitude value of the tracking error signal TE detected in the system lead-in area (tracks A) is defined as WA. The level of the LVL signal detected in the system lead-in area (tracks A) is defined as LVLA. The measuring unit 24d normalizes the amplitude value of the tracking error signal TE on the basis of the level of the LVL signal to obtain a value WLA; the measuring unit 24d calculates WLA=WA/LVLA (step A8). By normalizing the amplitude value of the tracking error signal TE on the basis of the LVL signal, it is possible to avoid the adverse effects of a variation in the quality of emitted light caused by a shift of the objective lens 12 and a variation in reflectance depending on the disk position (including the adverse effect of adhesion of dirt, dust, or the like).

The normalization is executed on the basis of the LVL signal (addition signal) but may be executed on the basis of the RFPP signal. Further, the amplitude of the PP-TE signal is proportional to the intensity of reflected light and thus decreases in the presence of the RF signal. It is thus possible to assume a decrease in the amplitude of the PP-TE signal in the presence of the RF signal (if the SIGDET signal is at an H level) and to simply normalize signals from a recorded and unrecorded areas using the SIGDET signal. The DPD signal has no relations to the intensity of reflected light.

Then, the FG1 signal rises (step A9, Yes5). The PUP movement control unit 24b of the controller 24 actuates the servo amplifier 18 to allow the driver 22 to output the tracking driving signal to the pickup head 11 (TRO—output) (step A10). In other words, the tracking actuator in the pickup head 11 is driven to displace the objective lens 12 so as to irradiate the data area (outer circumferential side) with laser beam from the objective lens 12.

Upon detecting the next rise of the FG1 signal (step A11, Yes), the measuring unit 24d measures the amplitude value of the tracking error signal TE output by the head amplifier 14 as well as the level of the LVL signal (addition signal) as is the case with step A8. The measuring unit 24d then averages the amplitude values measured while the optical disk 10 is rotated once by the disk motor 32, that is, before the next rise of the FG1 signal is detected.

Here, the amplitude value of the tracking error signal TE detected in the data area (tracks B) is defined as WB. The level of the LVL signal detected in the data area (tracks B) is defined as LVLB. The measuring unit 24d normalizes the amplitude value of the tracking error signal TE on the basis of the level of the LVL signal to obtain a value WLB; the measuring unit 24d calculates WLB=WB/LVLB (step A12).

Figure 6:
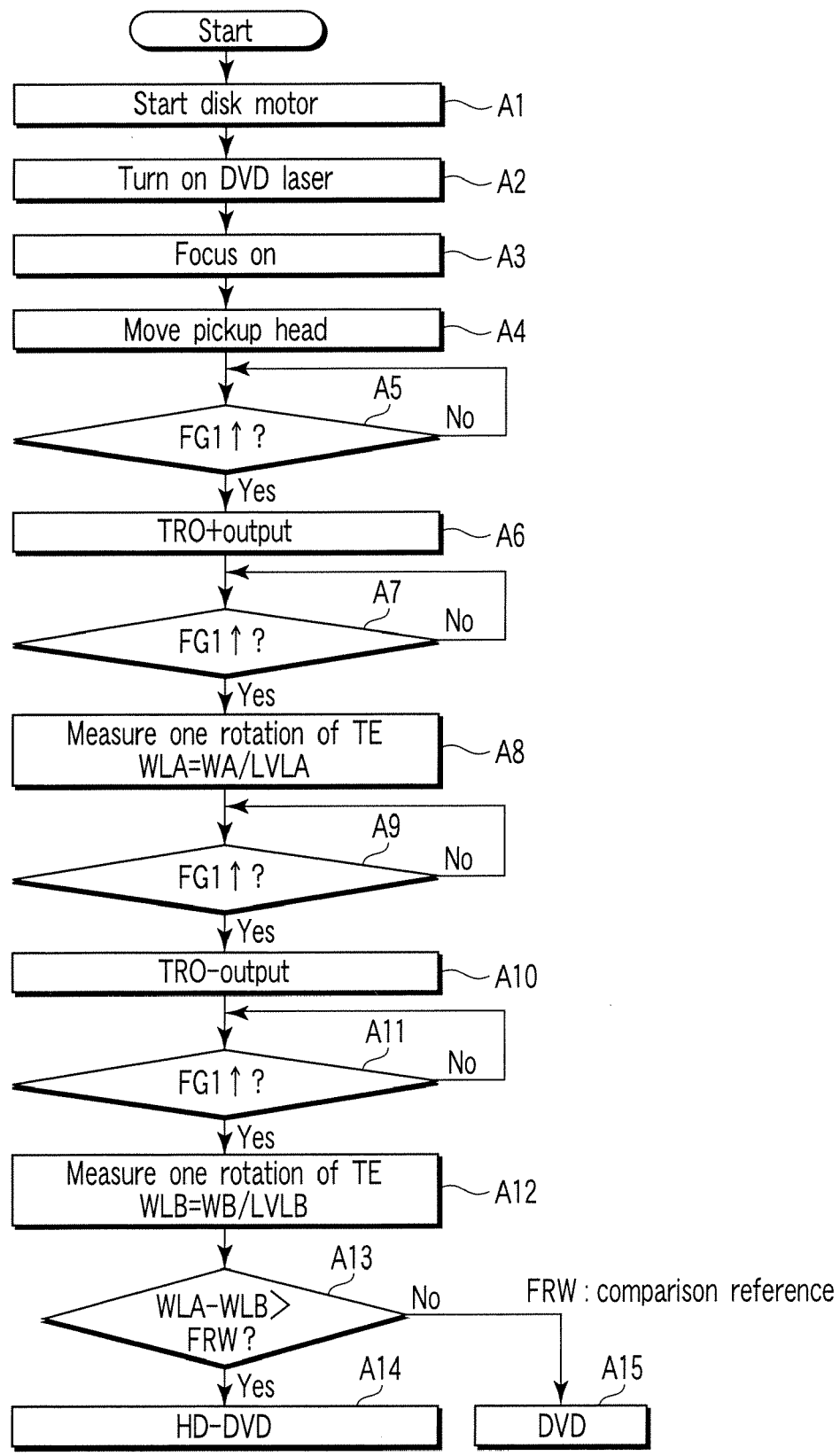
FIG. 6 is a flowchart illustrating a disk type determining process of determining whether the disk is DVD or HD-DVD according to the present embodiment.

The flowchart in FIG. 6 shows a process of shifting the objective lens 12 twice to measure the tracking error signal TE once for each of the system lead-in area (tracks A) and data area (tracks B). The processing between steps A5 and A12 may be repeated to shift the objective lens 12 four times to measure the tracking error signal TE twice for each of the system lead-in area (tracks A) and data area (tracks B).

In this case, the measuring unit 24d averages the values each obtained by normalizing the amplitude value of the tracking error signal TE on the basis of the level of the LVL signal; the values are calculated for the lead-in area and data area.

The second amplitude value of the tracking error signal TE measured in the system lead-in area is defined as WA2. The second level of the LVL signal measured in the system lead-in area is defined as LVLA2. Then, the measuring unit 24d normalizes the amplitude value of the tracking error signal TE on the basis of the level of the LVL signal to obtain a value WLA2; the measuring unit 24d calculates WLA2=WA2/LVLA2. Likewise, the second amplitude value of the tracking error signal TE measured in the data area is defined as WB2. The second level of the LVL signal measured in the data area is defined as LVLB2. Then, the measuring unit 24d normalizes the amplitude value of the tracking error signal TE on the basis of the level of the LVL signal to obtain a value WLB2; the measuring unit 24d calculates WLBA2=WB2/LVLB2. The measuring unit 24d then calculates WLA=(WLA1+WLA2)/2 and WLB=(WLB1+WLB2)/2. The tracking error signal TE is thus measured a number of times for each of these areas and normalized, with the resulting values averaged. This improves the accuracy of disk type determinations.

Then, the comparing unit 24e of the controller 24 calculates the difference between WLA and WLB (WLA−WLB), which corresponds to an evaluation value. The comparing unit 24e then compares the evaluation value with a present determination reference FRW. If the evaluation value (WLA−WLB) is larger than the comparison reference FRW (step A13, Yes), it is possible to determine that there is a large difference between WLA and WLB owing to the difference in track pitch between the system lead-in area and the data area. The disk type determining unit 24f of the controller 24 therefore determines that the optical disk 10 installed in the optical disk device is HD-DVD (step A14).

If the evaluation value is not larger than the comparison reference FRW (step A13, No), it is possible to determine that there is no large difference in track pitch between the system lead-in area and the data area. The disk type determining unit 24f of the controller 24 therefore determines that the optical disk 10 installed in the optical disk device is DVD (step A15).

Whether the optical disk 10 is DVD or HD-DVD can thus be determined on the basis of the amplitude values of the tracking errors in the different areas (tracks A and B).

In the example shown in FIG. 7, the tracking error signal TE is measured twice for each area (tracks A and B). The tracking error signal TE may be measured three or more times for each area.

To shorten the time required for the disk type determining process, the tracking error signal TE may be measured only once for each area as shown in the flowchart in FIG. 6. Moreover, in the example shown in FIG. 7, the tracking error signal TE is measured after the rise of the FG1 signal following the shift in the objective lens 12 and before the optical disk 10 is completely rotated once. However, the tracking error signal TE may be measured for a shorter time. For example, provided that less than one rotation of the optical disk 10 can be detected from a signal output by the frequency divider 34, a predetermined rotation amount corresponding to less than one rotation may be measured so that the disk type can be determined on the basis of the amplitude value of the tracking error signal TE measured during this rotation.

In the above description, the signals (TE or LVL) measured during one rotation of the optical disk 10 are averaged. However, the minimum value may be measured.

If the objective lens 12 is to be shifted, rapidly driving the actuator (an increase in the speed at which the objective lens 12 moves) may cause resonance because the actuator is supported by a spring. This may result in overshooting or undershooting. Thus, the objective lens 12 is preferably moved slowly.

As described above, in the disk type determining process shown in the flowchart in FIG. 6, the pickup head 11 is moved to the vicinity of the boundary between the system lead-in area and the data area. The objective lens 12 is then shifted a number of times (in the example shown in FIG. 7, twice) so that the tracking error signal TE can be measured a number of times for each of the system lead-in area and data area. If the tracking errors measured for these areas are almost the same, the optical disk 10 can be determined to be DVD, which has the same track pitch in the system lead-in area and in the data area (or is different from HD-DVD). If the amplitude value varies between the areas, the optical disk 10 can be determined to be HD-DVD, which has a smaller track pitch in the data area than in the system lead-in area.

Only the DVD laser, having a larger wavelength, is used to measure the tracking error signal TE. This avoids damaging the optical disk 10 regardless of whether the optical disk 10 installed in the optical disk device is DVD or HD-DVD. This configuration also eliminates the need to switch the laser, thus reducing the processing time. Further, the amplitude value of the tracking error signal TE measured in the single optical disk 10 is used to determine the disk type. This enables the disk type to be both accurately and stably determined without being affected by, for example, a variation in pit depth or eccentricity caused by an error in the shape or installation of the optical disk 10.

Now, with reference to the flowchart shown in FIGS. 8, 9, and 10, description will be given of a disk type determining process of determining to which of the three types CD, DVD, and HD-DVD the optical disk 10 belongs.

To determine to which of the three types the optical disk 10 belongs, the optical disk device according to the present embodiment makes a first determination on the basis of the difference in substrate thickness between CD and DVD/HD-DVD. If the optical disk is determined not to be CD, the optical disk device determines whether the disk is DVD or HD-DVD.

Figure 11A:
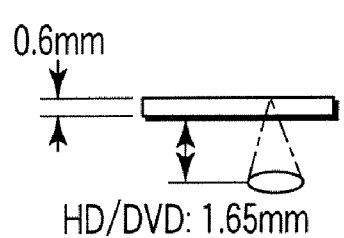
FIGS. 11A and 11B are diagrams illustrating a difference in substrate thickness between DVD/HD-DVD and CD.
Figure 11B:
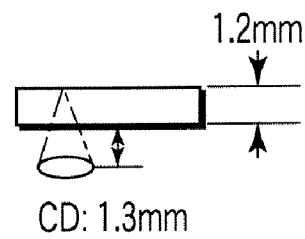

FIGS. 11A and 11B show the difference in substrate thickness between DVD/HD-DVD and CD. The thickness from disk surface to recording layer (substrate thickness) is 0.6 mm for DVD/HD-DVD as shown in FIG. 11A and 1.2 mm for CD as shown in FIG. 11B. The working distance of the objective lens 12 (distance from objective lens 12 to disk surface in a focus on state) is 1.65 mm for HD/DVD and 1.3 mm for CD.

First, the optical disk 10 is installed on the disk motor 32. Then, the PUH movement control unit 24b of the controller 24 uses the driver 26 to drive the feed motor 28. The pickup head 11 is thus moved to a position where it lies opposite a specific area in the optical disk 10, for example, a position corresponding to the data area (tracks B) in the optical disk 10 (step B1). The laser control unit 24c of the controller 24 controls APC 36 so that the red laser for DVD (DVD laser) in the pickup head 11 is turned on (step B2).

The disk type determination based on the optical disk 10 substrate thickness does not involve rotation of the disk motor 32. This enables a measuring operation to be immediately started. Further, the use of the DVD laser, having a larger wavelength, makes this method unlikely to damage the optical disk 10 regardless of the type of the optical disk installed in the optical disk device. Furthermore, as described later, the disk type determination based on the substrate thickness reduces the time for which laser beam emitted by the pickup head 11 focuses on the optical disk 10. This makes it unlikely to damage the optical disk 10 installed in the optical disk device even if the optical disk 10 is CD on which data can be recorded.

Figure 12:
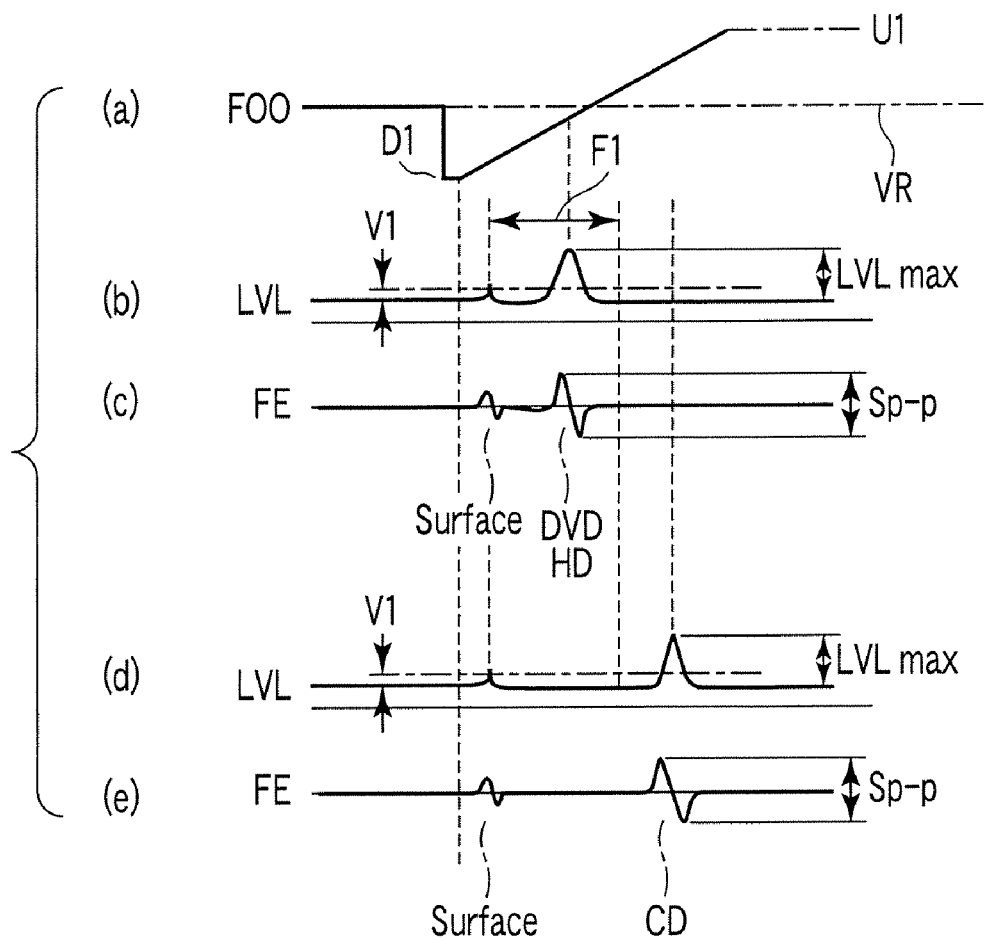
FIG. 12 is a diagram illustrating the operation of a disk type determining process based on the substrate thickness of the disk according to the present embodiment.

FIG. 12 is a diagram illustrating an operation of the disk type determining process based on the optical disk 10 substrate thickness. (a) shown in FIG. 12 is a diagram showing a variation in the focus driving signal FOO output to the focusing actuator in the pickup head 11. (b) and (d) shown in FIG. 12 are diagrams showing the LVL signal, which varies as the objective lens 12 moves in accordance with the focus driving signal FOO. (c) and (e) shown in FIG. 12 are diagrams similarly showing a variation in the focus error signal FE. (b) and (c) shown in FIG. 12 show signal variations observed if the optical disk 10 is DVD or HD-DVD. (d) and (e) shown in FIG. 12 show signal variations observed if the optical disk 10 is CD.

First, the controller 24 actuates the servo amplifier 16 to set the level of the focus driving signal FOO output to the pickup head 11, to D1 (step B3). In other words, the focusing actuator in the pickup head 11 is driven to move the objective lens 12 away from the optical disk 10. On this occasion, the disk motor 32 is at a stop.

Then, to move the objective lens 12 at a fixed speed in the direction of the optical axis, the PUH movement unit 24b of the controller 24 allows the driver 20 to output the focus driving signal FOO to the focusing actuator as shown in FIG. 12 (step B4). The focusing actuator moves the objective lens 12 in the direction of the optical axis toward the optical disk 10 in accordance with the focus driving signal FOO, having a voltage value varying at a fixed inclination. The PUH movement unit 24b allows driver 20 to output the focus driving signal FOO to the focusing actuator while increasing the voltage value at a fixed rate until it reaches a preset voltage limit value U1 (step B6).

In the meantime, the head amplifier 14 outputs various signals such as the LVL signal and focus error signal FE in accordance with light reflected by the optical disk 10 and which is received by the pickup head 11. The comparing unit 24e of the controller 24 compares the voltage value of the LVL signal output by the head amplifier 14 with a preset reference value V1 to determine whether or not the voltage value of the LVL signal is at least the reference value V1 (step B5). The reference value V1 is set to make it possible to determine the voltage value of the LVL signal output in accordance with the laser beam reflected by the surface of the optical disk 10. A comparison of the LVL signal with the reference value V1 thus makes it possible to sense a variation in signal depending on the light reflected by the surface of the optical disk 10. The reflection by the surface of the optical disk 10 is almost the same regardless of whether the disk is CD, DVD, or HD. Consequently, it is possible to sense a variation in signal depending the on light reflected by the surface of the optical disk 10, on the basis of the common reference value V1.

If the voltage value of the LVL signal is smaller than the reference value V1 even if the focus driving signal FOO reaches the voltage limit value U1 (step B6, Yes), the disk type determining unit 24f of the controller 24 determines that the optical disk 10 is not installed in the optical disk device. Even if the optical disk 10 is installed in the optical disk device, the absence of the optical 10 disk is determined in the following case because of improper detection of the LVL signal: the surface of the optical disk 10 (which is irradiated with laser beam) is stained or the optical disk 10 is installed upside down. If the absence of the disk is determined, then for example, the spot position of laser beam emitted by the pickup head 11 may be changed before the above processing is executed again.

On the other hand, upon detecting that the voltage value of the LVL signal is at least the reference value V1 (step B5, Yes), the measuring unit 24d of the controller 24 starts an F1 timer for measuring the time having elapsed since it sensed a signal change corresponding to the light reflected by the surface of the optical disk 10 (step B7).

Subsequently, the comparing unit 24e of the controller 24 compares the voltage value of the LVL signal output by the head amplifier 14 with the preset reference value V1. The comparing unit 24e thus determines again whether or not the voltage value of the LVL signal is at least the reference value V1 (step B8). In other words, the comparing unit 24e senses a signal change corresponding to the light reflected by the recording layer in the optical disk 10.

On the other hand, if the voltage value of the LVL signal is at least the reference value V1, the controller 24 determines whether or not the value in the F1 timer is at most a preset reference time F1. As shown in FIGS. 12(*a*) and 12(*b*), if the value in the F1 timer is at most the reference time F1 (step B8, Yes), the disk type determining unit 24f of the controller 24 determines that the optical disk 10 installed in the optical disk device is HD-DVD or DVD (step B9). A shown in FIGS. 12(b) and 12(d), the reference time F1 is set between a timing for sensing a signal change for the recording layer in CD of substrate thickness 1.2 mm and a timing for sensing a signal change for the recording layer in DVD or HD-DVD of substrate thickness 0.6 mm.

When the optical disk 10 is determined to be HD-DVD or DVD, the disk type determining unit 24f starts executing a disk type determining process of determining whether the optical disk 10 is HD-DVD or DVD.

Specifically, the rotation control unit 24a of the controller 24 controls the motor control unit 30 so that the disk motor 32 is rotated at a predetermined rotation speed (step B10). The PUH movement control unit 24b of the controller 24 also actuates the servo amplifier 16 to focus laser beam emitted by the pickup head 11, on the optical disk 10 (step B11). The controller 24 then executes an HD/DVD determining process to determine whether the optical disk 10 installed in the optical disk device is HD-DVD or DVD (step B12).

Figure 9:
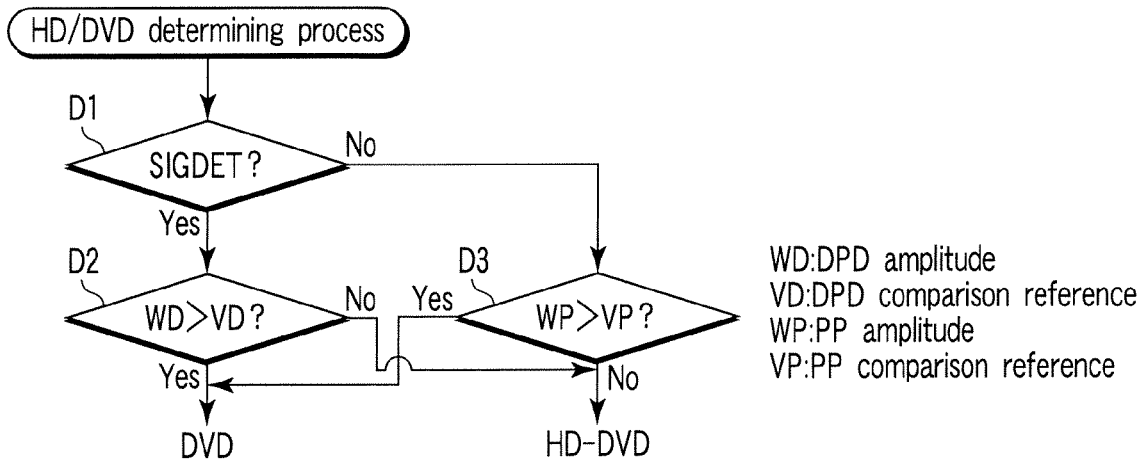
FIG. 9 is a flowchart illustrating an HD/DVD determining process according to the present embodiment.
Figure 10:
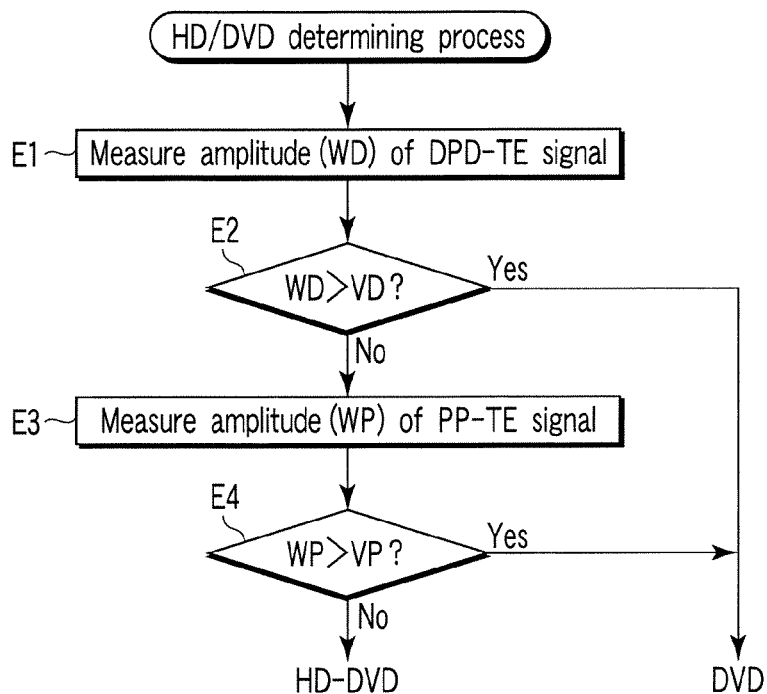
FIG. 10 is a flowchart illustrating an HD/DVD determining process according to the present embodiment.

The HD/DVD determining process corresponds to the processing between steps A4 and A13 shown in the flowchart in FIG. 6, previously described, or the processing shown in the flowchart in FIG. 9 or 10, previously described. Description of the processing shown in the flowchart in FIG. 6 is omitted.

Description will be given of the HD/DVD determining process shown in the flowchart in FIG. 9. The HD/DVD determining process shown in FIG. 9 determines whether the disk is HD-DVD or DVD on the basis of the amplitude value of the tracking error signal measured at the same position without moving the position of the pickup head 11. To measure the tracking error signal TE, focus balancing is pre-executed so as to maximize the amplitude value of the tracking error signal TE. This makes it possible to solve the problem of a displaced focal point resulting from optical aberration caused by the adverse effect of substrate thickness of the optical disk.

First, if a focus on operation has caused the head amplifier 14 to output the SIGDET signal (step D1, Yes), that is, the focus on operation has set the SIGDET signal at the H level, then the controller 24 measures the amplitude value WD of the DPD-TE signal output by the head amplifier 14. For example, the measuring unit 24d of the controller 24 measures the amplitude value of the DPD-TE signal output by the head amplifier 14 during one rotation of the disk motor 32. The measuring unit 24d then specifies the maximum value measured during the rotation as the amplitude value WD.

The comparing unit 24e of the controller 24 determines whether or not the amplitude value WD is larger than a preset reference value VD. If the amplitude value WD is larger than the reference value VD (step D2, Yes), the controller 24 determines that the optical disk 10 installed in the optical disk device is DVD (step B13). If the amplitude value WD is at most the reference value VD (step D2, No), the disk type determining unit 24f of the controller 24 determines that the optical disk 10 installed in the optical disk device is HD-DVD (step B14).

On the other hand, if the SIGDET signal is not output (step D1, No), that is, the SIGDET signal is at an L level, then the amplitude value WP of the PP-TE signal output by the head amplifier 14 is measured. As preciously described, the measuring unit 24d of the controller 24 measures the amplitude value of the PP-TE signal output by the head amplifier 14 during one rotation of the disk motor 32. The measuring unit 24d then specifies the maximum value measured during the rotation as the amplitude value WP.

The controller 24 determines whether or not the amplitude value WP is larger than a preset reference value VP. If the amplitude value WP is larger than the reference value VP (step D3, Yes), the controller 24 determines that the optical disk 10 installed in the optical disk device is DVD (step B13). If the amplitude value WP is at most the reference value VP (step D3, No), the controller 24 determines that the optical disk 10 installed in the optical disk device is HD-DVD (step B14).

Thus, whether the disk is DVD or HD-DVD can be determined on the basis of the amplitude value of the DPD-TE signal if the SIGDET signal is at the H level and on the basis of the amplitude value of the PP-TE signal if the SIGDET signal is at the L level.

If the SIGDET signal is at the H level, data is recorded on the optical disk 10. That is to say, the optical disk 10 is stamp media (ROM-based disk) or recordable media on which data is recorded. In either case, the amplitude of the DPD-TE signal can be detected at a level specified for the DPD method. Consequently, if the DPD-TE signal detected using the DVD laser has an amplitude value larger than the reference value VD, the tracking error signal is properly detected, thus making it possible to determine that the disk is DVD.

If the SIGDET signal is at the L level, the optical disk 10 is recording media on which data is not recorded. If the optical disk 10 is recording media on which data is not recorded, the amplitude of the PP-TE signal can be detected at a level specified for the PP method. Consequently, if the PP-TE signal detected using the DVD laser has an amplitude value larger than the reference value VP, the tracking error signal is properly detected, thus making it possible to determine that the disk is DVD.

Now, description will be given of an HD/DVD determining process shown in the flowchart in FIG. 10. The HD/DVD determining process shown in FIG. 9 selects the tracking error signal used for the disk type determination, in accordance with the SIGDET signal. However, the HD/DVD determining process shown in FIG. 10 eliminates the determination for the SIDGET signal.

First, the controller 24 measures the amplitude value WD of the DPD-TE signal output by the head amplifier 14 (step E1). For example, the measuring unit 24d of the controller 24 measures the amplitude value of the DPD-TE signal output by the head amplifier 14 during one rotation of the disk motor 32. The measuring unit 24d then specifies the maximum value measured during the rotation as the amplitude value WD.

The controller 24 determines whether or not the amplitude value WD is larger than the preset reference value VD. If the amplitude value WD is larger than the reference value VD (step E2, Yes), the controller 24 determines that the optical disk 10 installed in the optical disk device is DVD (step B13). If the amplitude value WD is not larger than the reference value VD (step D2, No), the controller 24 measures the amplitude value WP of the PP-TE signal output by the head amplifier 14 (step E3). As previously described, the measuring unit 24d of the controller 24 measures the amplitude value of the PP-TE signal output by the head amplifier 14 during one rotation of the disk motor 32. The measuring unit 24d then specifies the maximum value measured during the rotation as the amplitude value WP.

The comparing unit 24e of the controller 24 determines whether or not the amplitude value WP is larger than the preset reference value VP. If the amplitude value WP is larger than the reference value VP (step E4, Yes), the disk type determining unit 24f of the controller 24 determines that the optical disk 10 installed in the optical disk device is DVD (step B13). If the amplitude value WP is not larger than the reference value VP (step E4, No), the disk type determining unit 24f determines that the optical disk 10 installed in the optical disk device is HD-DVD (step B14).

In the flowchart shown in FIG. 10, the amplitude value of the DPD-TE signal is first used as a basis for the disk type determination. However, the amplitude value of the PP-TE signal may first be used as a basis for the disk type determination.

The HD/DVD determining process shown in FIG. 10 can determine the disk type on the basis of the amplitude value of either the DPD-TE or PP-TE signal.

In step S8, even if the value in the F1 timer exceeds the reference time F1 (step S8, No), if the voltage value of the LVL signal is smaller than the reference value V1, the disk type determining unit 24f determines that the optical disk 10 installed in the optical disk device is CD or HD-DVD (step B15).

Determining that the disk may be HD-DVD is due to the possibility that the disk is recordable media such as HD-R. Stamp media of HD-DVD does not depend on the wavelength of the laser. Accordingly, any LVL signal having an amplitude value required for disk type determinations can be detected using laser beam of any wavelength. However, for recordable media of HD-DVD (HD-R or the like), the HD-DVD standards specify only sensitivity (reflectance) required for the laser beam for HD-DVD (blue laser). Consequently, with laser beam of a wavelength different from that of the blue laser (for example, the DVD laser), the recording layer in the optical disk may not sufficiently reflect the laser beam. This may prevent the detection of the LVL signal having the amplitude value required for disk type determinations.

The laser control unit 24c of the controller 24 controls APC 36 so that the DVD laser in the pickup head 11 is turned off, while the CD laser for CD is turned on (step B16). The CD laser does not damage the disk installed in the optical disk device even if it is HD-DVD.

The controller 24 subsequently determines whether the disk is CD or HD-DVD, on the basis of the difference in substrate thickness, that is, the distance from disk surface to recording layer (reflection layer), between CD and HD-DVD (steps B17 to B21). The processing between B17 and B21 is similar to that between steps B3 and B8 and its detailed description is thus omitted.

However, it is possible to use a reference time and a reference value which is different from the reference time F1 and the reference value V1 used for the process using the DVD laser and which is suitable for the CD laser.

The CD laser makes it possible to reliably determine whether or not the optical disk is CD. This is because the CD disk standards specify a high reflectance for the reflection of CD laser beam by the recording layer in CD. In step B23, if the value in the F1 timer exceeds the reference time F1 and then the voltage value of the LVL signal becomes equal to or larger than the reference value V1, the disk type determining unit 24f determines that the optical disk 10 installed in the optical disk device is CD (step B31).

If the optical disk is not determined to be CD (step B23, No), the optical disk 10 installed in the optical disk device is likely to be HD-DVD. In this case, to more reliably determine that the disk is HD-DVD, the HD laser is used to make disk type determination on the basis of the substrate thickness.

The laser control unit 24c of the controller 24 controls APC 36 so that the CD laser in the pickup head 11 is turned off, while the HD-DVD laser is turned on (step B24).

The controller 24 subsequently determines whether the disk is CD or HD-DVD, on the basis of the difference in substrate thickness, that is, the distance from disk surface to recording layer (reflection layer), between CD and HD-DVD (steps B25 to B30). The processing between B25 and B30 is similar to that between steps B3 and B8 and its detailed description is thus omitted.

However, it is possible to use a reference time and a reference value which is different from the reference time F1 and the reference value V1 used for the process using the CD laser and which is suitable for the HD-DVD laser.

In this case, light from the HD laser for HD-DVD is most efficiently reflected by the recording layer in HD-DVD, with the LVL signal significantly changed ((b) shown in FIG. 12). This makes it possible to more reliably determine whether the disk is HD-DVD or CD.

If CD or DVD is mistakenly determined to be HD-DVD, the HD laser is used for the optical disk 10. In this case, if CD or DVD is recordable media, it is likely to be damaged. However, more reliably determining whether or not the optical disk is HD-DVD makes it possible to avoid damaging the recordable media.

Figure 8:
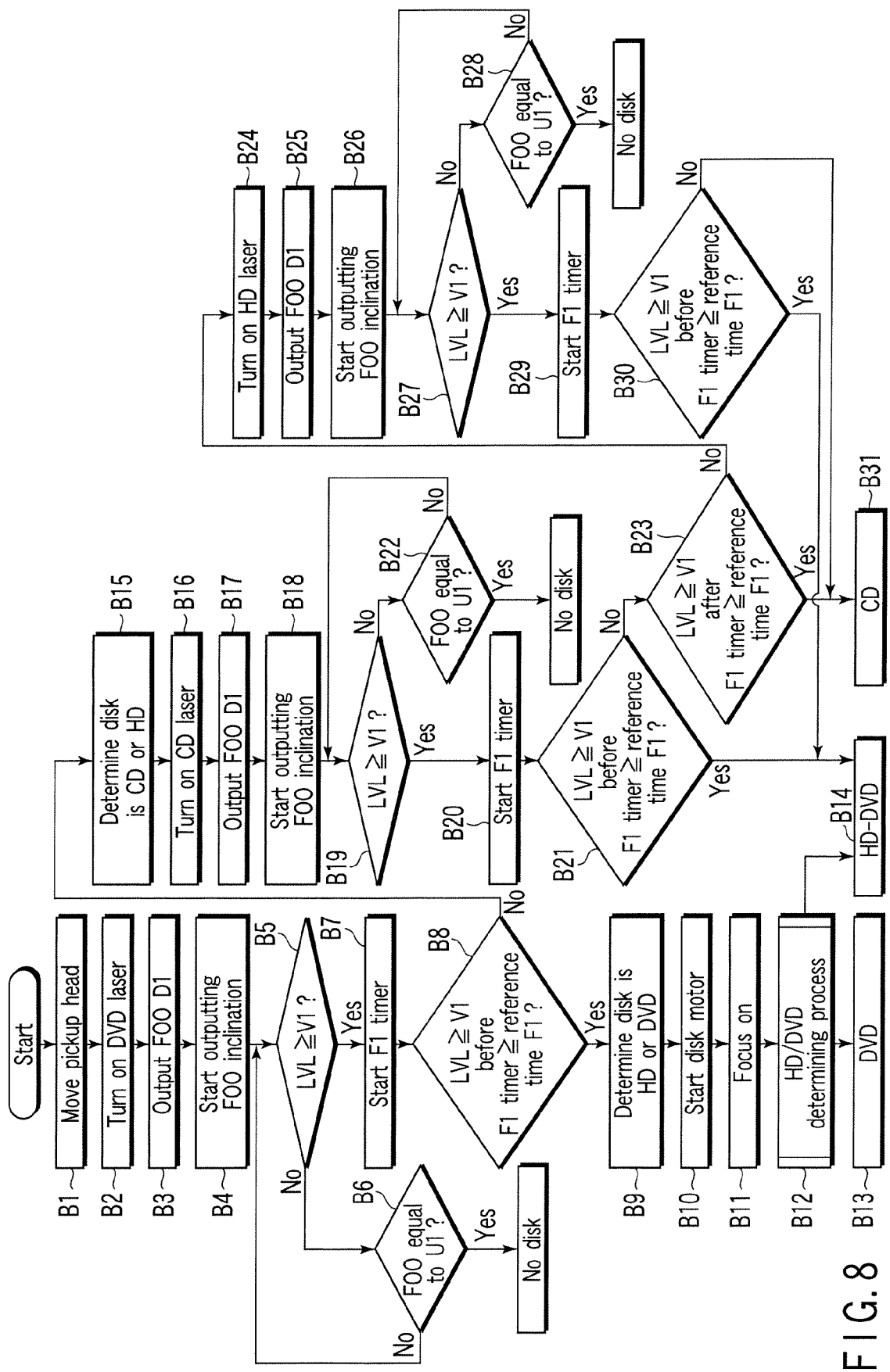
FIG. 8 is a flowchart illustrating a disk type determining process of determining to which of three types the optical disks 10 belongs.

Thus, the disk type determining process shown in the flowchart in FIG. 8 can distinguish CDs with different substrate thicknesses from one another on the basis of the LVL signal, which is varied by moving the pickup head 11 to the data area and the objective lens 12 toward the optical disk 10. If the optical disk is determined to be DVD or HD-DVD, whether the disk is DVD or HD-DVD can be determined on the basis of the amplitude value of the tracking error signal (DPD-TE or PP-TE signal) measured at the same position, without moving the pickup head 11. If the optical disk 10 installed in the optical disk device is DVD or HD-DVD, only the DVD laser is used, thus preventing a possible delay in processing associated with switching of the laser.

Further, the DVD laser for DVD having a larger wavelength is used to measure the tracking error signal TE. This avoids damaging the optical disk 10 installed in the optical disk device regardless of the type of the optical disk 10. Although the DVD laser is also used to determine whether or not the disk is CD, it requires only a short time to focus on the optical disk and thus insignificantly affect the optical disk.

Now, with reference to the flowchart shown in FIG. 13, description will be given of a disk type determining process of determining to which of the three types, CD, DVD, and HD-DVD, the optical disk 10 belongs.

The disk type determining process shown in FIG. 13 is basically similar to that shown in FIG. 8. Specifically, to determine to which of the three types the optical disk 10 belongs, whether or not the optical disk is CD is first determined on the basis of the difference in substrate thickness between CD and DVD/HD-DVD. If the optical disk is determined not to be CD, the controller 24 determines whether the optical disk is DVD or HD-DVD. Although the disk type determining process shown in FIG. 8 first uses the DVD laser, the present process first uses the CD laser. This enables a reduction in the time required to determine whether or not the optical disk is CD.

First, the optical disk 10 is installed on the disk motor 32. The PUH movement control unit 24b of the controller 24 uses the driver 26 to drive the feed motor 28. The pickup head 11 is thus moved to a position where it lies opposite a particular area in the optical disk 10, for example, a position corresponding to the data area (tracks B) in the optical disk 10 (step C1). The laser control unit 24c of the controller 24 controls APC 36 so that the infrared laser for CD (CD laser) in the pickup head 11 is turned on (step C2).

The processing between C3 and C8 is similar to that between steps B3 and B8 and its detailed description is thus omitted.

However, it is possible to use a reference time and a reference value which is different from the reference time F1 and the reference value V1 used for the process using the DVD laser and which is suitable for the CD laser.

The CD laser makes it possible to reliably determine whether or not the optical disk is CD. This is because the CD disk standards specify a high reflectance for the reflection of CD laser beam by the recording layer in CD. In step C9, if the value in the F1 timer not exceeds the reference time F1 and then the voltage value of the LVL signal becomes equal to or larger than the reference value V1, the disk type determining unit 24f determines that the optical disk 10 installed in the optical disk device is CD.

On the other hand, if the voltage value of the LVL signal becomes equal to or larger than the reference value V1 while the value in the F1 timer is at most the reference time F1 (step C8, Yes) or if the voltage value of the LVL signal does not become equal to or larger than the reference value V1 after the value in the F1 timer has exceeded the reference time F1 (step C9, No), the disk type determining unit 24f determines that the optical disk 10 installed in the optical disk device is DVD or HD-DVD (step C10).

The controller 24 turns on the DVD laser in the pickup head 11 to execute a disk type determining process using the DVD laser (steps C11 to C16). The processing between C12 and C16 is similar to the between steps B10 and B14 and its detailed description is thus omitted.

Thus, the CD laser is first used to determine whether or not the disk is CD on the basis of the difference in disk substrate thickness. This enables quick determination to be achieved if the optical disk 10 installed in the optical disk device is CD. Further, only the DVD laser is used to determine whether the disk is DVD or HD-DVD, thus avoiding damaging the disk. The present process also produces effects similar to those of the previously described disk type determining processes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk device configured so that at least a first DVD optical disk or a second DVD optical disk is installed into the optical disk device, the second DVD optical disk having a smaller track width than the first DVD optical disk, the optical disk device comprising:
a motor which rotates the installed optical disk;
a pickup head which irradiates the optical disk with first DVD laser beam or second DVD laser beam through an objective lens to receive reflected light from the optical disk;
a moving mechanism which moves the pickup head in a radial direction of the optical disk;
a head amplifier which receives the reflected light from the pickup head to output at least a focus error signal, a tracking error signal, and an addition signal;
a driving mechanism which uses the focus error signal and the tracking error signal to drive the pickup head to perform focus ON control and track positioning control; and
a controller which controls the motor, the pickup head, the moving mechanism, the head amplifier, and the driving mechanism,
the controller determining a first measured value as an average value of a plurality of amplitude values of the tracking error signal output by the head amplifier while the optical disk makes at least one rotation when the pickup head irradiates a system lead-in area of the rotating optical disk with the first DVD laser beam, or as a value obtained by normalizing the average value,
the controller shifting the objective lens of the pickup head to the data area of the optical disk,
the controller determining a second measured value as an average value of a plurality of amplitude values of the tracking error signal output by the head amplifier while the optical disk makes at least one rotation when a data area of the optical disk is irradiated with the first DVD laser beam, or as a value obtained by normalizing the average value,
the controller determining an evaluation value by subtracting the second measured value from the first measured value,
the controller comparing the evaluation value with a prescribed reference value, and
the controller determining that the installed optical disk is the first DVD optical disk if the evaluation value is smaller than the reference value, and determining that the installed optical disk is the second DVD optical disk if the evaluation value is larger than the reference value.

2. An optical disk device configured so that at least one of a CD optical disk, a first DVD optical disk, or a second DVD optical disk is installed into the optical disk device, the second DVD optical disk having a smaller track width than the first DVD optical disk, the optical disk device comprising:
a motor which rotates the installed optical disk;
a pickup head which irradiates the optical disk with CD laser beam, first DVD laser beam, or second DVD laser beam through an objective lens to receive reflected light from the optical disk;
a moving mechanism which moves the pickup head in a radial direction of the optical disk;
a head amplifier which receives the reflected light from the pickup head to output at least a focus error signal, a tracking error signal, and an addition signal;
a driving mechanism which uses the focus error signal and the tracking error signal to drive the pickup head to perform focus ON control and track positioning control; and
a controller which controls the motor, the pickup head, the moving mechanism, the head amplifier, and the driving mechanism,
the controller which allows the pickup head to irradiate a data area of the optical disk with the first DVD laser beam and which controls the driving mechanism to shift the objective lens in the pickup head from a position away from the optical disk to a front surface of the optical disk,
the controller allowing a timer to start clocking when the addition signal output by the head amplifier during the shifting reaches at least a prescribed reference value,
the controller determining that the installed optical disk is the first DVD optical disk or the second DVD optical disk if the addition signal output by the head amplifier during the shifting reaches at least the prescribed reference value before the time clocked by the timer reaches a prescribed reference time, and the controller determining that the installed optical disk is the CD optical disk or the second DVD optical disk if the addition signal output by the head amplifier during the shifting does not reach the prescribed reference value before the time clocked by the timer reaches the prescribed reference time.

3. The optical disk device according to claim 2, wherein the controller determines that no disk is installed if the addition signal output by the head amplifier does not reach the prescribed reference value after the objective lens in the pickup head has started shifting from the position away from the optical disk toward the front surface of the optical disk.

4. The optical disk device according to claim 2, wherein after determining that the installed optical disk is the first DVD optical disk or the second DVD optical disk,
   the controller subtracts a second measured value determined from an amplitude value of the tracking error signal output by the head amplifier when the pickup head irradiates the data area of the rotating optical disk with the first DVD laser beam, from a first measured value determined from the amplitude value of the tracking error signal output by the head amplifier when the pickup irradiates a system lead-in area of the rotating optical disk with the first DVD laser beam, to determine an evaluation value,
   the controller comparing the evaluation value with a prescribed reference value, and
   the controller determining that the installed optical disk is the first DVD optical disk if the evaluation value is smaller than the reference value, and determining that the installed optical disk is the second DVD optical disk if the evaluation value is larger than the reference value.

5. The optical disk device according to claim 2, wherein after determining that the installed optical disk is the first DVD optical disk or the second DVD optical disk,
   the controller compares the prescribed reference value with a measured value determined from the amplitude value of the tracking error signal output by the head amplifier when the pickup head irradiates the data area of the rotating optical disk with the first DVD laser beam, and
   the controller determining that the installed optical disk is the first DVD optical disk if the measured value is larger than the reference value, and determining that the installed optical disk is the second DVD optical disk if the measured value is smaller than the reference value.

6. The optical disk device according to claim 2, wherein the measured value determined from the amplitude value of the tracking error signal is a maximum value of a plurality of amplitude values detected while the optical disk makes at least one rotation.

7. The optical disk device according to claim 2, wherein after determining that the installed disk is the CD optical disk or the second DVD optical disk,
   the controller allows the pickup head to irradiate the data area of the optical disk with the CD laser beam and controls the driving mechanism to shift the objective lens in the pickup head from the position away from the optical disk to the front surface of the optical disk,
   the controller allows the timer to start clocking when the addition signal output by the head amplifier during the shifting reaches at least a prescribed reference value, and
   the controller determines that the installed optical disk is the second DVD optical disk if the addition signal output by the head amplifier during the shifting reaches at least the prescribed reference value before the time clocked by the timer reaches the prescribed reference time.

8. The optical disk device according to claim 2, wherein after determining that the installed disk is the CD optical disk or the second DVD optical disk,
   the controller allows the pickup head to irradiate the data area of the optical disk with the CD laser beam and controls the driving mechanism to shift the objective lens in the pickup head from the position away from the optical disk to the front surface of the optical disk,
   the controller allows the timer to start clocking when the addition signal output by the head amplifier during the shifting reaches at least a prescribed reference value, and
   the controller determines that the installed optical disk is the CD optical disk if the addition signal output by the head amplifier during the shifting reaches at least the prescribed reference value after the time clocked by the timer has reached the prescribed reference time.

9. The optical disk device according to claim 2, wherein after not determining that the installed disk is the CD optical disk,
   the controller allows the pickup head to irradiate the data area of the optical disk with the second DVD laser beam and controls the driving mechanism to shift the objective lens in the pickup head from the position away from the optical disk to the front surface of the optical disk,
   the controller allows the timer to start clocking when the addition signal output by the head amplifier during the shifting reaches at least a prescribed reference value, and
   the controller determines that the installed optical disk is the second DVD optical disk if the addition signal output by the head amplifier during the shifting reaches at least the prescribed reference value before the time clocked by the timer reaches the prescribed reference time.

10. A method for determining a type of a disk for an optical disk device configured so that at least a first DVD optical disk or a second DVD optical disk is installed into the optical disk device, the second DVD optical disk having a smaller track width than the first DVD optical disk, the method comprising:
    irradiating the optical disk with first DVD laser beam or second DVD laser beam through an objective lens and positioning a pickup head which receives reflected light from the optical disk, at a boundary between a system lead-in area and a data area of the optical disk;
    irradiating the system lead-in area of the rotating optical disk with the first DVD laser beam from the objective lens in the pickup head;
    determining a first measured value as an average value of a plurality of amplitude values of a tracking error signal output by a head amplifier which receives the reflected light from the system lead-in area while the optical disk makes at least one rotation, or as a value obtained by normalizing the average value;
    shifting the objective lens in the pickup head to the data area of the optical disk;
    irradiating the data area of the rotating optical disk with the first DVD laser beam from the objective lens in the pickup head;
    determining a second measured value as an average value of a plurality of amplitude values of the tracking error signal output by the head amplifier which receives the reflected light from the data area while the optical disk makes at least one rotation, or as a value obtained by normalizing the average value;
    subtracting the second measured value from the first measured value to calculate an evaluation value;
    comparing the evaluation value with a prescribed reference value; and determining that the installed optical disk is the first DVD optical disk if the evaluation value is smaller than the reference value, and determining that the installed optical disk is the second DVD optical disk if the evaluation value is larger than the reference value.

11. A method for determining a type of a disk for an optical disk device configured so that at least one of a CD optical disk, a first DVD optical disk or a second DVD optical disk is installed into the optical disk device, the second DVD optical disk having a smaller track width than the first DVD optical disk, the method comprising:

irradiating the optical disk with CD laser beam, first DVD laser beam, or second DVD laser beam through an objective lens and positioning a pickup head which receives reflected light from the optical disk, in a data area of the optical disk;

allowing a driving mechanism for the pickup head to shift the objective leans in the pickup head from a position away from the disk toward a front surface of the disk;

irradiating the data area of the optical disk with the first DVD laser beam from the pickup head during the shifting;

allowing a timer to start clocking when an addition signal output by a head amplifier which receives reflected light from the data area during the shifting reaches at least a prescribed reference value;

determining that the installed optical disk is the first DVD optical disk or the second DVD optical disk if the addition signal output by the head amplifier during the shifting reaches at least the prescribed reference value before the time clocked by the timer reaches a prescribed reference time; and determining that the installed optical disk is the CD optical disk or the second DVD optical disk if the addition signal output by the head amplifier during the shifting does not reach the prescribed reference value before the time clocked by the timer reaches the prescribed reference time.

12. The method for determining a type of a disk optical disk device according to claim 11, further comprising:

after determining that the installed optical disk is the first DVD optical disk or the second DVD optical disk, positioning the pickup head at a boundary between a system lead-in area and the data area of the optical disk;

irradiating the system lead-in area of the rotating optical disk with the first DVD laser beam from the objective lens in the pickup head;

determining a first measured value from an amplitude value of a tracking error signal output by the head amplifier which receives the reflected light from the system lead-in area;

shifting the objective lens in the pickup head to the data area of the optical disk;

irradiating the data area of the rotating optical disk with the first DVD laser beam from the objective lens in the pickup head;

determining a second measured value from the amplitude value of the tracking error signal output by the head amplifier which receives the reflected light from the data area;

subtracting the second measured value from the first measured value to calculate an evaluation value;

comparing the evaluation value with a prescribed reference value; and determining that the installed optical disk is the first DVD optical disk if the evaluation value is smaller than the reference value, and determining that the installed optical disk is the second DVD optical disk if the evaluation value is larger than the reference value.

13. The method for determining a type of a disk optical disk device according to claim 11, further comprising:

after determining that the installed optical disk is the first DVD optical disk or the second DVD optical disk, irradiating the data area of the rotating optical disk with the first DVD laser beam from the pickup head;

comparing a prescribed reference value with a measured value determined from the amplitude value of the tracking error signal output by the head amplifier which receives the reflected light from the data area; and determining that the installed optical disk is the first DVD optical disk if the measured value is larger than the reference value, and determining that the installed optical disk is the second DVD optical disk if the measured value is smaller than the reference value.

14. The method for determining a type of a disk optical disk device according to claim 11, further comprising:

after determining that the installed optical disk is the CD optical disk or the second DVD optical disk, irradiating the data area of the optical disk with the CD laser beam from the pickup head;

allowing the driving mechanism to shift the objective lens in the pickup head from the position away from the optical disk to the front surface of the optical disk;

allowing the timer to start clocking when the addition signal output by the head amplifier during the shifting reaches at least a prescribed reference value;

determining that the installed optical disk is the second DVD optical disk if the addition signal output by the head amplifier during the shifting reaches at least the prescribed reference value before the time clocked by the timer reaches the prescribed reference time; and determining that the installed optical disk is the CD optical disk if the addition signal output by the head amplifier during the shifting reaches at least the prescribed reference value after the time clocked by the timer has been reached the prescribed reference time.

* * * * *